(12) United States Patent
Halliar

(10) Patent No.: US 7,306,415 B2
(45) Date of Patent: Dec. 11, 2007

(54) CLAMPING SYSTEM AND METHOD FOR SECURING FREIGHT

(75) Inventor: William R. Halliar, Whiting, IN (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 11/135,932

(22) Filed: May 23, 2005

(65) Prior Publication Data

US 2006/0013666 A1 Jan. 19, 2006

Related U.S. Application Data

(63) Continuation-in-part of application No. 10/440,927, filed on May 19, 2003, now Pat. No. 6,896,457.

(51) Int. Cl.
*B63B 25/04* (2006.01)
(52) U.S. Cl. ...................................................... 410/77
(58) Field of Classification Search .................. 410/31, 410/32, 34, 36, 42, 47–49, 77–79, 84, 86–87, 410/38
See application file for complete search history.

(56) References Cited

U.S. PATENT DOCUMENTS

| | | | |
|---|---|---|---|
| 1,850,597 A | 3/1932 | McGuire | |
| 2,331,416 A | 10/1943 | Muller | |
| 3,387,813 A | 6/1968 | Carino | |
| 3,480,248 A | 11/1969 | Lucchino et al. | |
| 3,595,177 A | 7/1971 | Bennett et al. | |
| 3,628,466 A | 12/1971 | Lyons et al. | |
| 3,658,011 A | 4/1972 | West et al. | |
| 3,658,195 A | 4/1972 | Fantin | |
| 3,922,004 A | 11/1975 | Chamberlain | |
| 4,365,919 A | 12/1982 | Mehlki | |
| 5,000,633 A | 3/1991 | Kowalik et al. | |
| 5,017,066 A | 5/1991 | Tylisz et al. | |
| 5,076,745 A | 12/1991 | Klein | |
| 5,211,518 A | 5/1993 | Mimica | |
| 5,336,027 A | 8/1994 | Paddock | |
| 5,343,813 A | 9/1994 | Septer | |
| 5,622,116 A | 4/1997 | Carlton | |
| 5,833,289 A | 11/1998 | Brolin | |
| 5,954,465 A | 9/1999 | Ellerbush | |
| 6,077,005 A | 6/2000 | Westlake | |
| 6,231,284 B1 | 5/2001 | Kordel | |
| 6,315,508 B1 | 11/2001 | Nadon | |
| 2002/0073884 A1 | 6/2002 | Al-Kaabi et al. | |

FOREIGN PATENT DOCUMENTS

FR 002689827 10/1993

*Primary Examiner*—H Gutman
(74) *Attorney, Agent, or Firm*—Brinks Hofer Gilson & Lione

(57) ABSTRACT

A method and system for securing freight during transport. The method and system secure the freight by using rotatable clamping mechanisms configure to apply axial pressure to the freight so as to prevent movement or shifting in transit. The rotatable clamping mechanisms are rotatable between an fully-opened position, a closed position such that the freight is secured, and a stowed position.

10 Claims, 30 Drawing Sheets

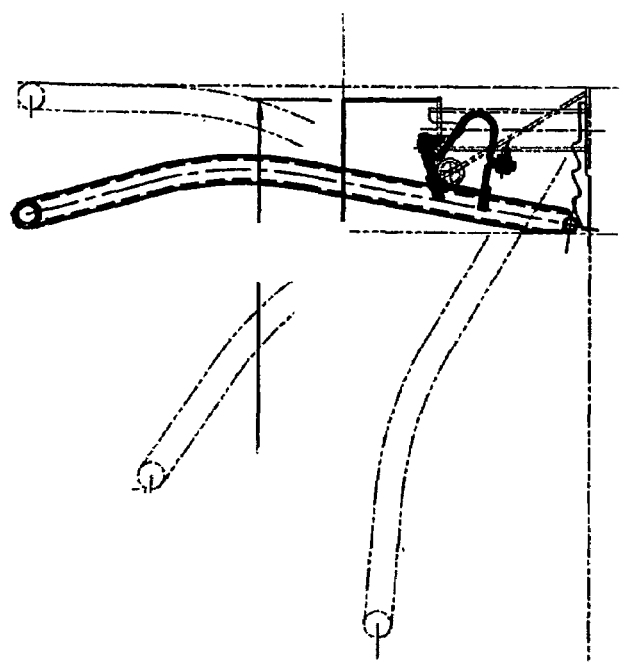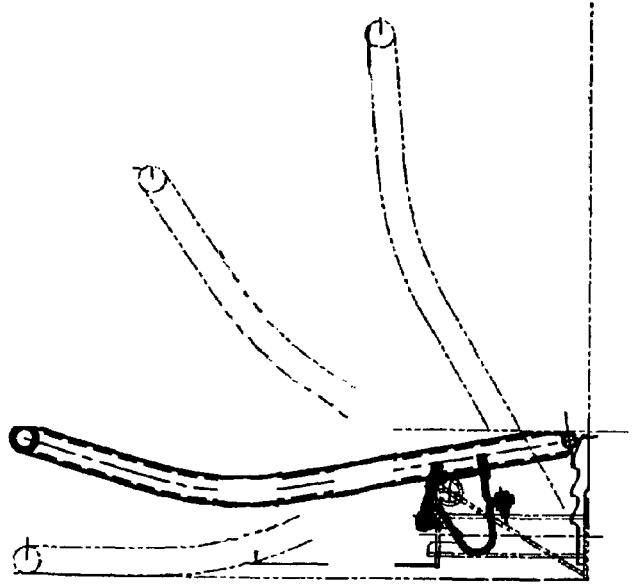
FIG. 33

CLAMPING SYSTEM AND METHOD FOR SECURING FREIGHT

RELATED APPLICATIONS

The present patent document is a continuation-in-part of application Ser. No. 10/440,927 filed May 19, 2003, now U.S. Pat. No. 6,896,457 which is hereby incorporated by reference herein.

FIELD OF THE INVENTION

This invention relates to transport load securement and more particularly to a clamping system designed for stabilizing or securing freight during transport.

BACKGROUND OF THE INVENTION

In prior art systems, bulky freight items, such as cylindrical rolls of coiled steel wire or sheets, are secured to railcars or other conventional transport vehicles by way of nylon tie-downs. Each roll is secured by a nylon strap running through the eye of the roll, and the ends of the strap are attached to the vehicle. At least one or two additional straps are placed over the top of the cylindrical roll, with the ends of the straps also attached to the vehicle. The use of nylon straps to secure the cylindrical rolls has several disadvantages. First, the straps often break in continual use, and in particular, due to the frictional deterioration incurred during transport as the extremely heavy rolls shift. Also, the nylon straps are subject to theft or loss. Because the straps are not permanently attached to the vehicles, they are easily removed and misplaced. Finally, the method of securing the rolls with the nylon tie-downs is extremely time-consuming, especially considering the large number of rolls being shipped daily.

When shipping alternative freight loads such as logs, pipes, and even pallets of goods, the freight tends to shift during transport. Shifting of the freight can cause damage to the goods and possibly loss of the freight as it can fall off the vehicle en route. While repetitive longitudinal forces acting upon the freight due to stopping and starting can cause the freight to shift, the forces from hunting, caused by chatter between the wheels and the rail, are the most dangerous to the freight.

BRIEF SUMMARY OF THE INVENTION

The present invention provides a method and system for securing freight.

In one aspect of the invention, a system is provided for securing various shapes and sizes of freight on a transport vehicle. The support system for securing freight on a transport vehicle comprises at least one pair of clamps mounted to said transport vehicle. Each of the clamps is rotatable and oriented to face inwardly toward an opposing clamp to hold the freight, and at least one bunk defined on said transport vehicle is positioned at least partially between the clamps.

In another aspect of the invention, a clamp for securing freight on a transport vehicle is described. The clamp includes at least one arm contacting a pivot for pivotal movement relative to said railcar, a first securing member attached at an upper distal end of the arm, and a second securing member attached at a lower distal end of the arm.

In yet another aspect of the invention, a method is provided for securing freight to a transport vehicle. The method includes the steps of providing a pair of opposing clamping mechanisms to the transport vehicle, wherein the pair of clamping mechanisms are rotatable between an open position and a closed position. The freight is placed between the opposing clamping mechanisms, and the opposing clamping mechanisms are rotated from the open position to a closed position.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

BRIEF DESCRIPTION OF SEVERAL VIEWS OF THE DRAWINGS

FIG. 33 is a side view of the third embodiment of the clamping mechanism in various rotational positions.

DETAILED DESCRIPTION OF THE INVENTION

Figure 1:
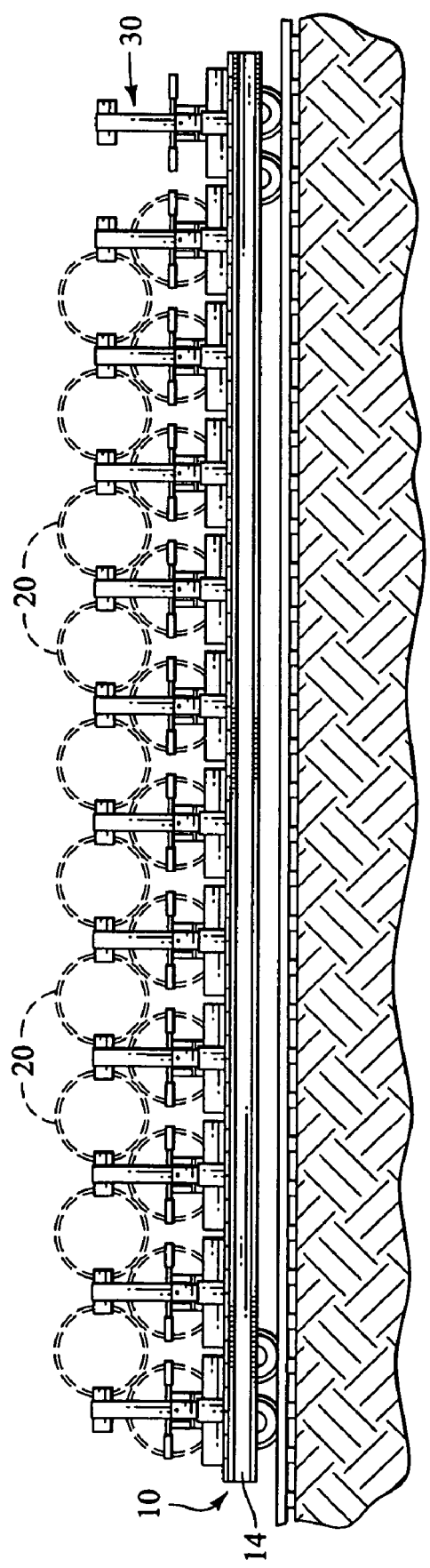
FIG. 1 is a side view of a railcar with two rows of cylindrical loads.

In the drawings, the freight is shown as a cylindrical load 20. While the exemplary embodiment of the clamping system of the present invention is used to secure cylindrical loads during transport, the clamping mechanism can also be used to secure various other sizes and shapes of freight. Also, the exemplary embodiment is shown attached to a railcar, but can be used with any type of conventional transport vehicle including, but not limited to, ships, airplanes, or tractor-trailers. The freight has been illustrated as a cylindrical load 20 or the like having a central opening or eye extending axially along the length of the cylindrical load 20. While the cylindrical load 20 is illustrated as a roll of coiled steel wire, the invention is applicable to securing other types of cylindrical loads as well, including coiled sheet steel, logs, or pipes. As an example, the typical roll of coiled steel wire weighs about 5800 lbs., and has a length ranging from about 58 to 90 inches.

Figure 2:
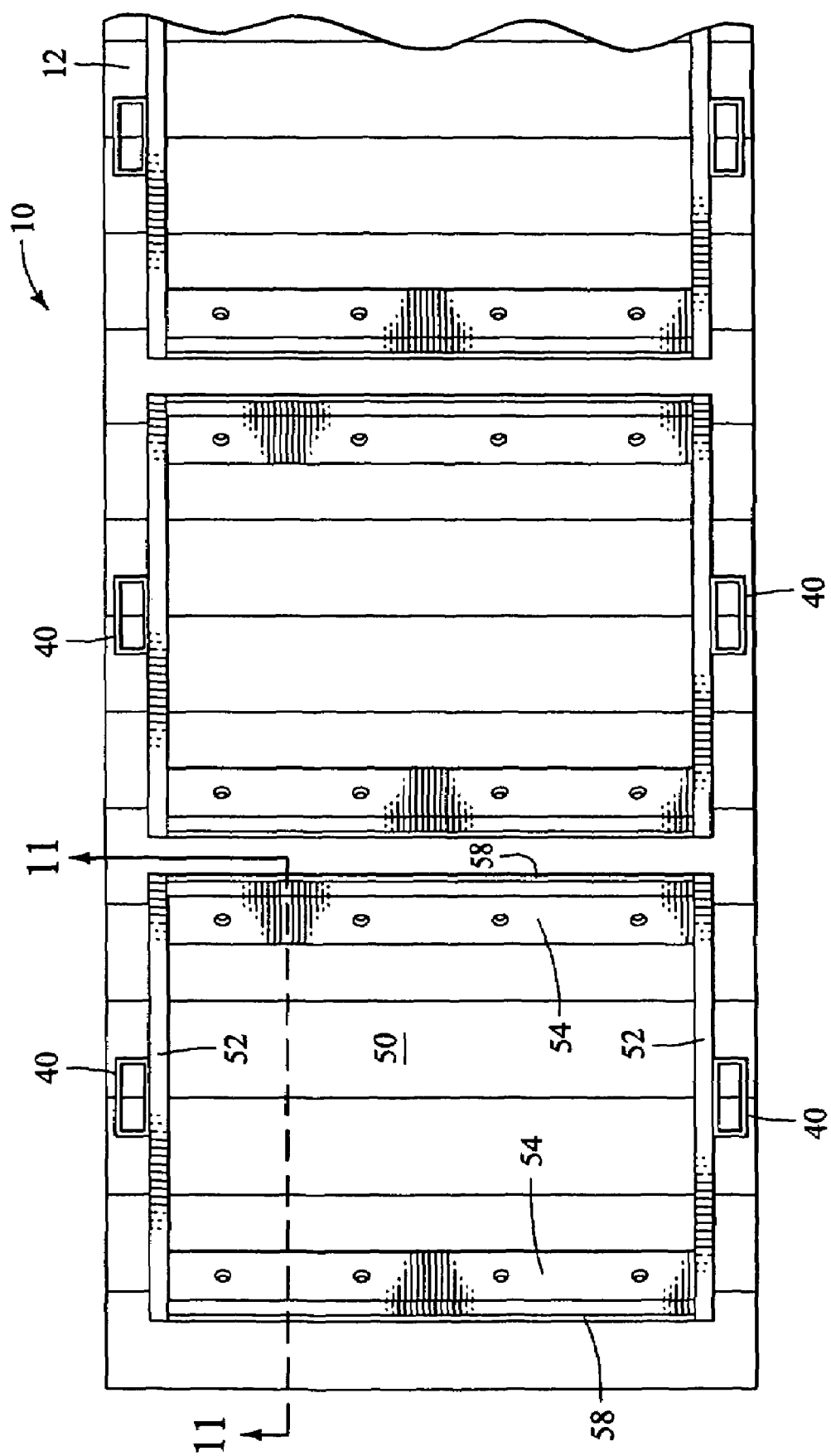
FIG. 2 is a top view a section of a railcar without clamping mechanisms.

FIGS. 1 and 2 are illustrations of a railcar 10 used for transporting cylindrical loads 20 or the like. The railcar 10 is illustrated as a conventionally flat-deck railcar on which the cylindrical loads 20 are supported, but can be any type of transportation vehicle. The deck 12 of the railcar 10 is supported by a pair of support beams 14 extending the length of the railcar 10. Each support beam 14 is located on opposing sides of the railcar 10. The support beams 14 are generally I-beams, or a similar structure.

Referring to FIG. 2, the railcar 10 defines a plurality of stake pockets 40 on the deck 12, along both sides of the railcar 10. The stake pockets 40 are preferably defined by hollow rectangular tubes attached to the end members 52 of the bunks 50. The stake pockets 40 are configured to receive a rack of bunks 50. The stake pockets 40 are preferably defined by steel walls of the tubes, but can also be made of any material of sufficient strength and durability to withstand the stresses of continuous use.

Figure 17:
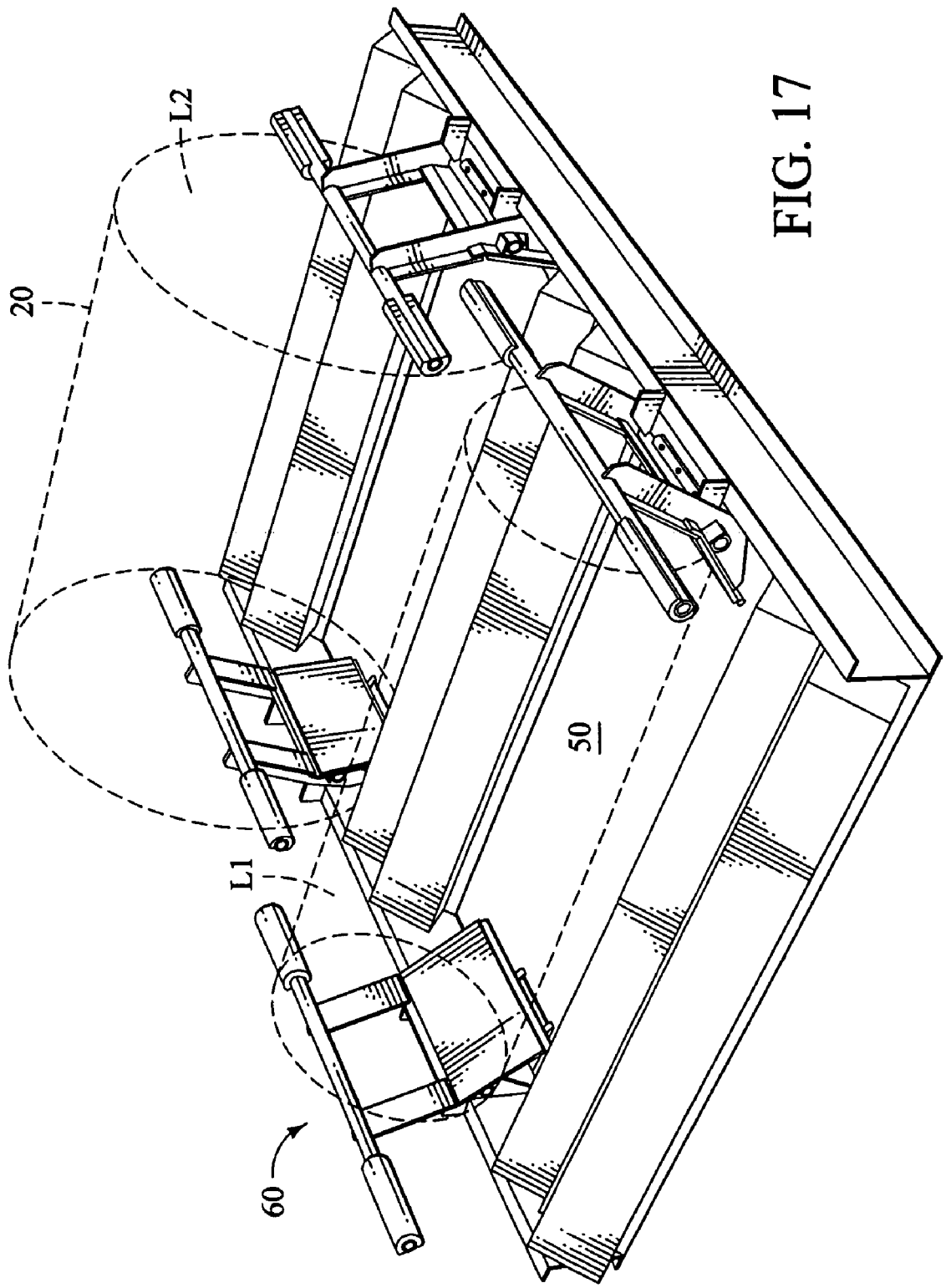
FIG. 17 is a top perspective view of a rack of bunks with clamping mechanisms of a first embodiment

The railcar 10 is equipped with a plurality of generally v-shaped bunks 50, as shown in FIGS. 2 and 17, which act as seats for a bottom row of cylindrical loads 20. The bunks 50 help to cradle the cylindrical loads 20 during transport. The bunks 50 are also used to evenly space the cylindrical loads 20 along the length of the railcar 10. The v-shape of the bunks 50 aids in preventing the cylindrical loads 20 from shifting or rolling in the fore-aft direction during transportation, when the axial length of a cylindrical load 20 is seated transverse to the long centerline of the railcar 10. In an alternative embodiment, the bunks 50 can be oriented so that the axial centerlines of the cylindrical loads 20 are parallel to the long centerline of the railcar 10. The bunks 50 are arranged in removable racks in which each rack includes at least one bunk 50, as shown in FIG. 17, and preferably includes three connected bunks 50. The racks are seated atop the deck 12 of the railcar 10 by inserting a portion of the rack into a stake pocket 40. Preferably, each of the four corners of the rack is secured to the deck 12 through a stake pocket 40. In an alternative embodiment, the bunks 50 can be attached directly to the support beams 14 when there is no deck 12. The vehicles used to transport freight are generally leased or rented, and are manufactured to haul various types of freight. Removable racks of bunks 50 with integrated clamping mechanisms 60 at opposing ends of each bunk 50 are a cost-effective way of ensuring secure transport of freight and the ability to return the transport vehicle in the same condition in which it was received at the beginning of the lease term. The bunks 50 can be configured to receive any size or shaped freight including, but not limited to, cylindrical loads, rectangular boxes, or stacked goods on a pallet. Freight can be located in the bunks such that the longitudinal length of the freight is aligned with the longitudinal length of the bunks (FIG. 18), the longitudinal length of the freight is aligned transverse to the longitudinal length of the bunks (FIG. 19), or any manner therebetween.

Figure 3:
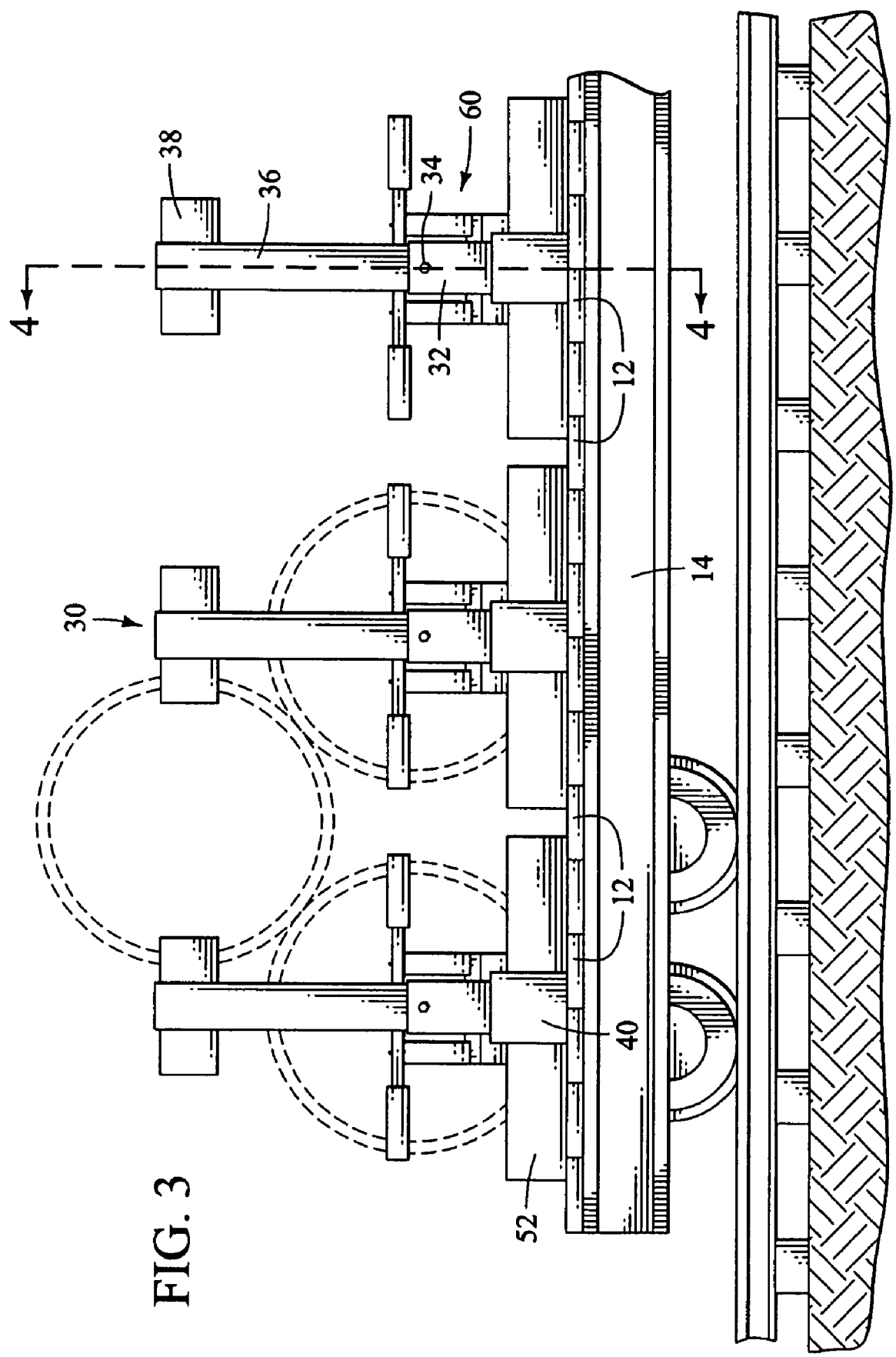
FIG. 3 is a close-up side view of a section of a railcar.

The present invention is very economical, easy to use, and extremely efficient. When layers of cylindrical loads 20 are shipped, only the lower row of cylindrical loads 20 needs to be secured, thereby reducing the amount of time required to secure the entire shipment. In one aspect of the present invention, a railcar 10 is provided with several racks of bunks 50, as illustrated in FIG. 2. A bottom layer of cylindrical loads 20 are to be seated into bunks 50 wherein the axis of the cylindrical load 20 is transverse to the long centerline of the railcar 20, as shown in FIG. 3. A clamping mechanism 60, in accordance with the present invention, is disposed at each end of a bunk 50 so as to contact the edge of a cylindrical load 20 and preferably provide axial pressure on the cylindrical load 20. This axial pressure from each clamping mechanism 60 assists in maintaining the structural integrity and shape of each cylindrical load 20, and also secures the cylindrical load 20 by preventing sway or rocking of the cylindrical load 20 transverse to the length of the railcar 10. For example, when rolls of sheet steel are shipped, they tend to telescope starting with the innermost concentric ring. This telescoping generally occurs as the transport vehicle turns, because a lateral force of about 3 Gs can be created during the turn. Such telescoping causes damage to the surface of the sheet, and once the roll has telescoped it can interfere with trains running on adjacent tracks. The clamping mechanism 60 prevents such telescoping by applying an axial pressure to the lower row of cylindrical load 20, and providing a lateral retaining beam 65 to further ensure that the upper row of cylindrical loads 20 does not telescope.

Side posts 30 are attached at each end of a bunk 50 in order to provide a safety measure to the upper layer of cylindrical loads 20, as shown in FIG. 2. The lower portion 32 of the side posts 30 are configured to fit within the stake pockets 40 in which a post is inserted into a stake pocket 40 and a wedge is then placed between the stake pocket 40 and side post 30 to ensure a tight fit. Preferably, the lower portions 32 are formed by hollow, generally rectangular steel stock. The upper portion 36 of the side posts 30 are preferably made of hollow rectangular steel stock. The upper portion 36 is configured to fit within the lower portion 32, yet can rotate 90 degrees (not shown) about a pivot bolt 34 connecting the upper and lower portions 36, 32. A safety member 38 is attached at the top of the upper portion 36 of the side posts 30. This safety member 38 is configured to contact the edge of cylindrical loads 20 to prevent the cylindrical loads 20 from falling over the edge of the railcar 10 in the event of shifting or telescoping during transport.

The preferred embodiment of each clamping system 60 of the present invention is configured to automatically adjust to secure a cylindrical load 20 with a length between 74 inches and 89¼ inches and a diameter of about 50 inches by rotation due to the weight of the cylindrical load. In other words, each clamping mechanism 60 will adjust to secure a cylindrical load 20 having a length within a given range. Otherwise, if the length of the cylindrical load 20 is too small, each clamping mechanism 60 must be manually rotated in order to secure the cylindrical load 20. The nominal length of a cylindrical load 20 is 74 inches.

Figure 4A:
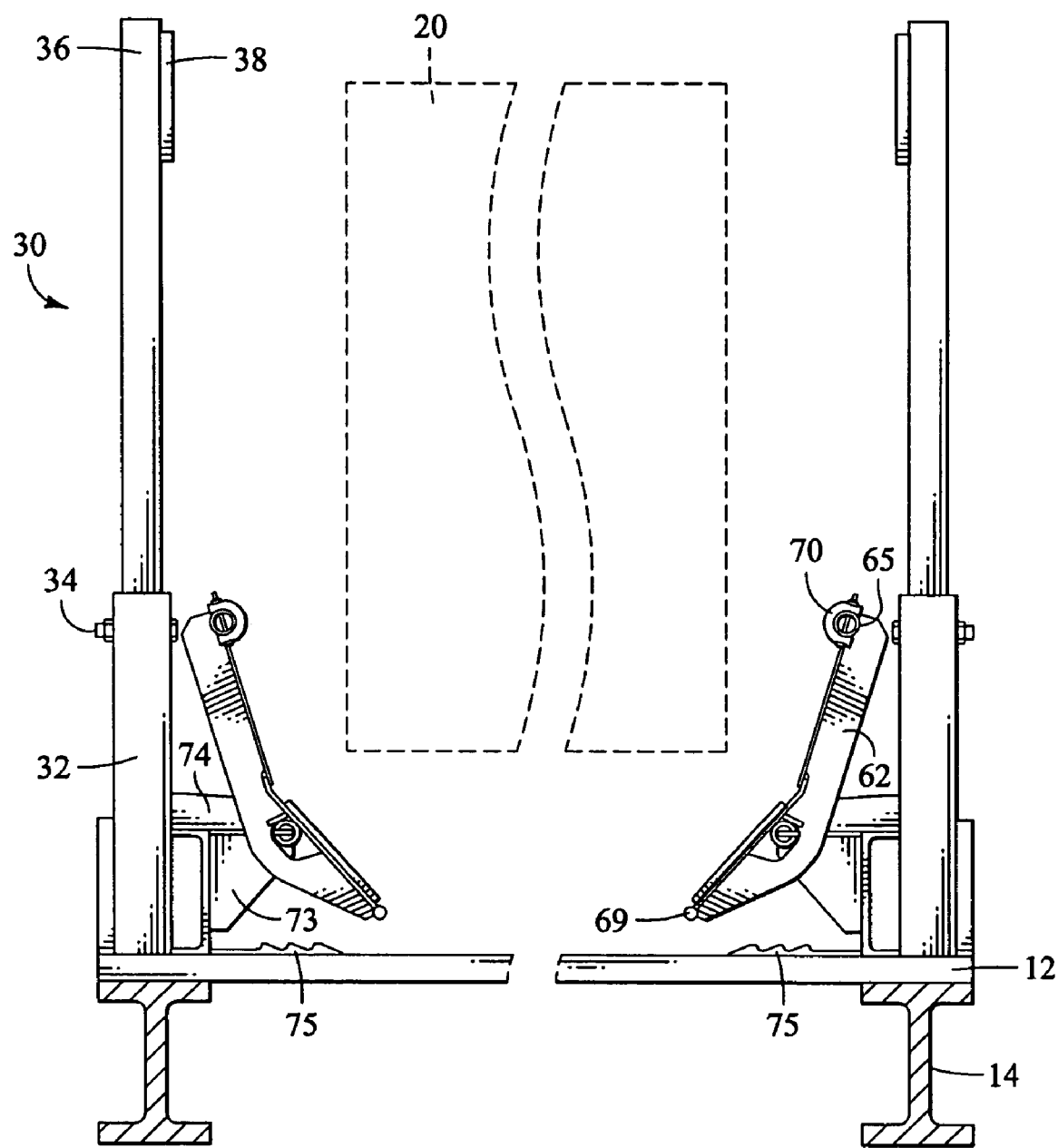
FIG. 4A is a side view of a pair of the clamping mechanisms of one embodiment in an open position before a cylindrical load is seated.
Figure 4B:
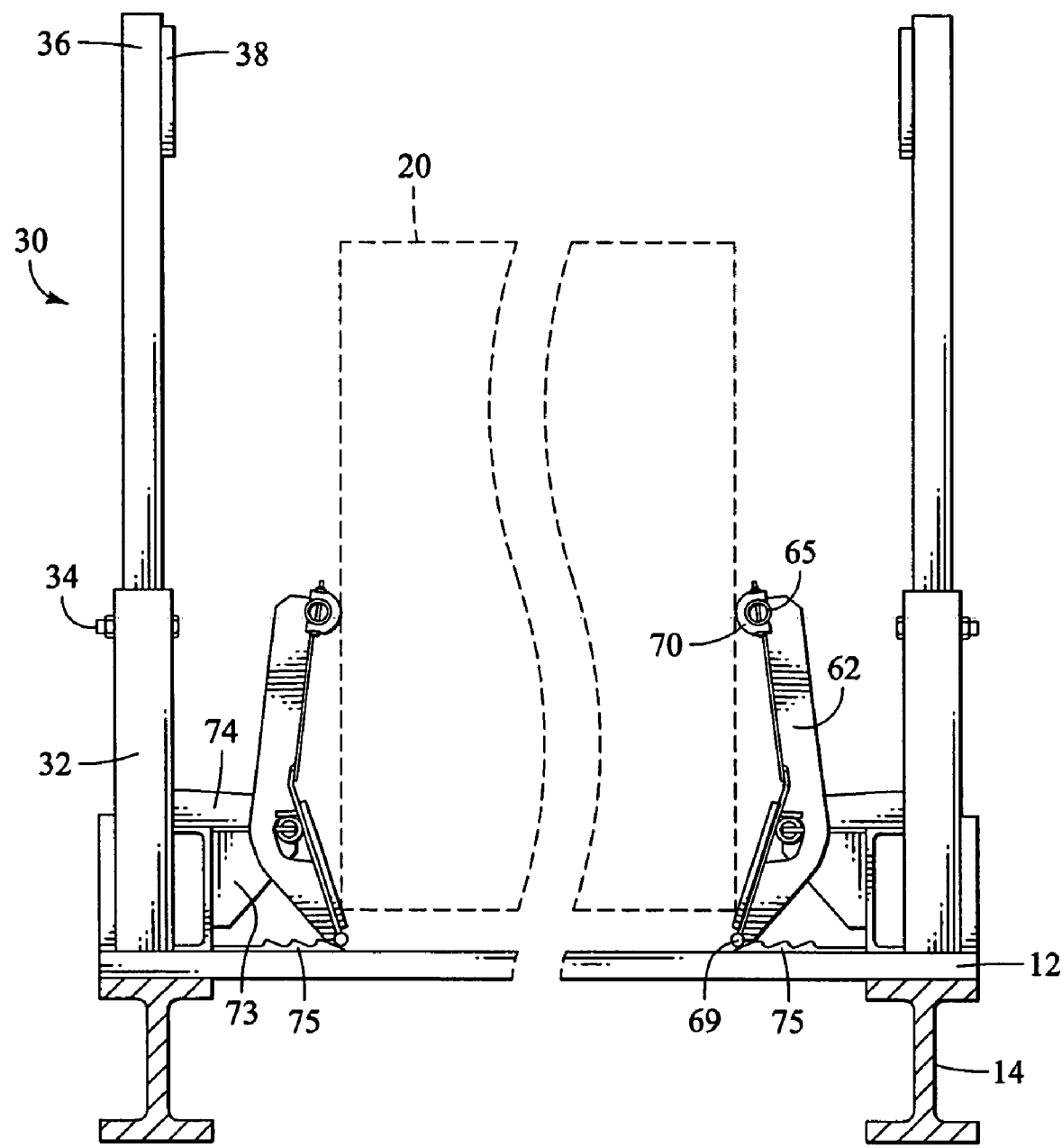
FIG. 4B is a side view of a pair of clamping mechanisms in a closed position after a cylindrical load is seated.

Each clamping mechanism 60 requires that a cylindrical load 20 within a range of lengths be placed into the bunk 50 between each of the opposed clamping mechanisms 60, after which the rotating action of each clamping mechanism 60 secures an end of a cylindrical load 20, as illustrated in FIGS. 4A-4B. When the length of the cylindrical load 20 is smaller than the nominal length, each clamping mechanism 60 requires a slight manual adjustment in order to rotate each clamping mechanism 60 into a closed, securing position. Reduced time and effort to secure the cylindrical load 20 results from the use of opposed clamping mechanisms 60 at each end of a bunk 50.

Figure 5:
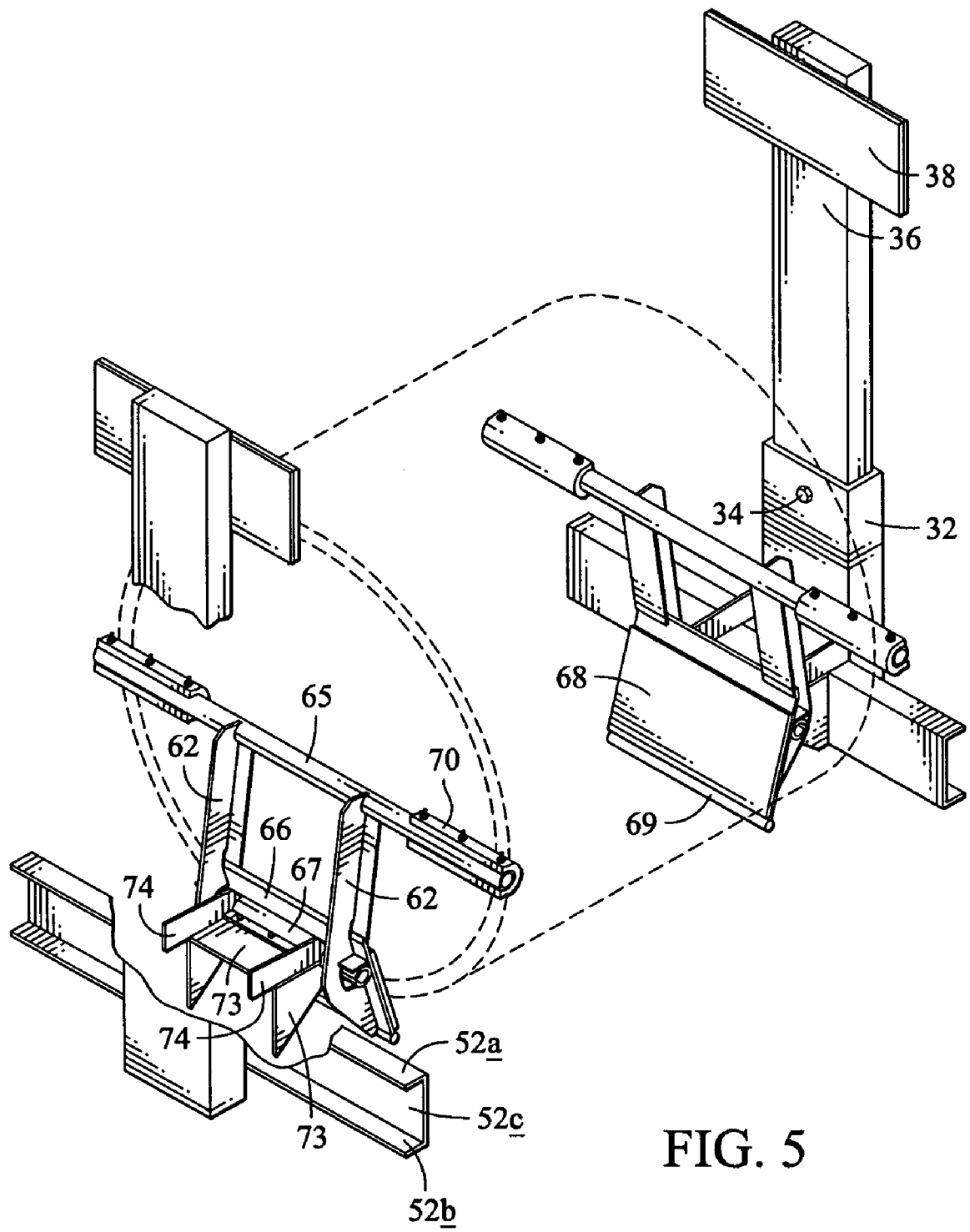
FIG. 5 is a top perspective view of the clamping mechanisms securing a cylindrical load.
Figure 11:
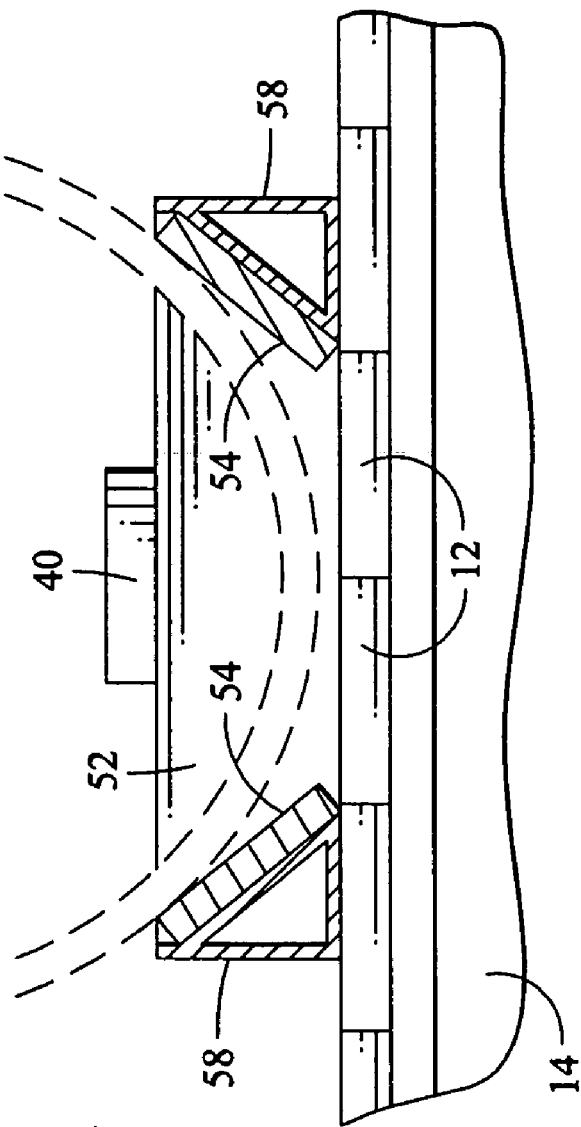
FIG. 11 is an end view of one embodiment of a bunk with a seated cylindrical load.
Figure 12:
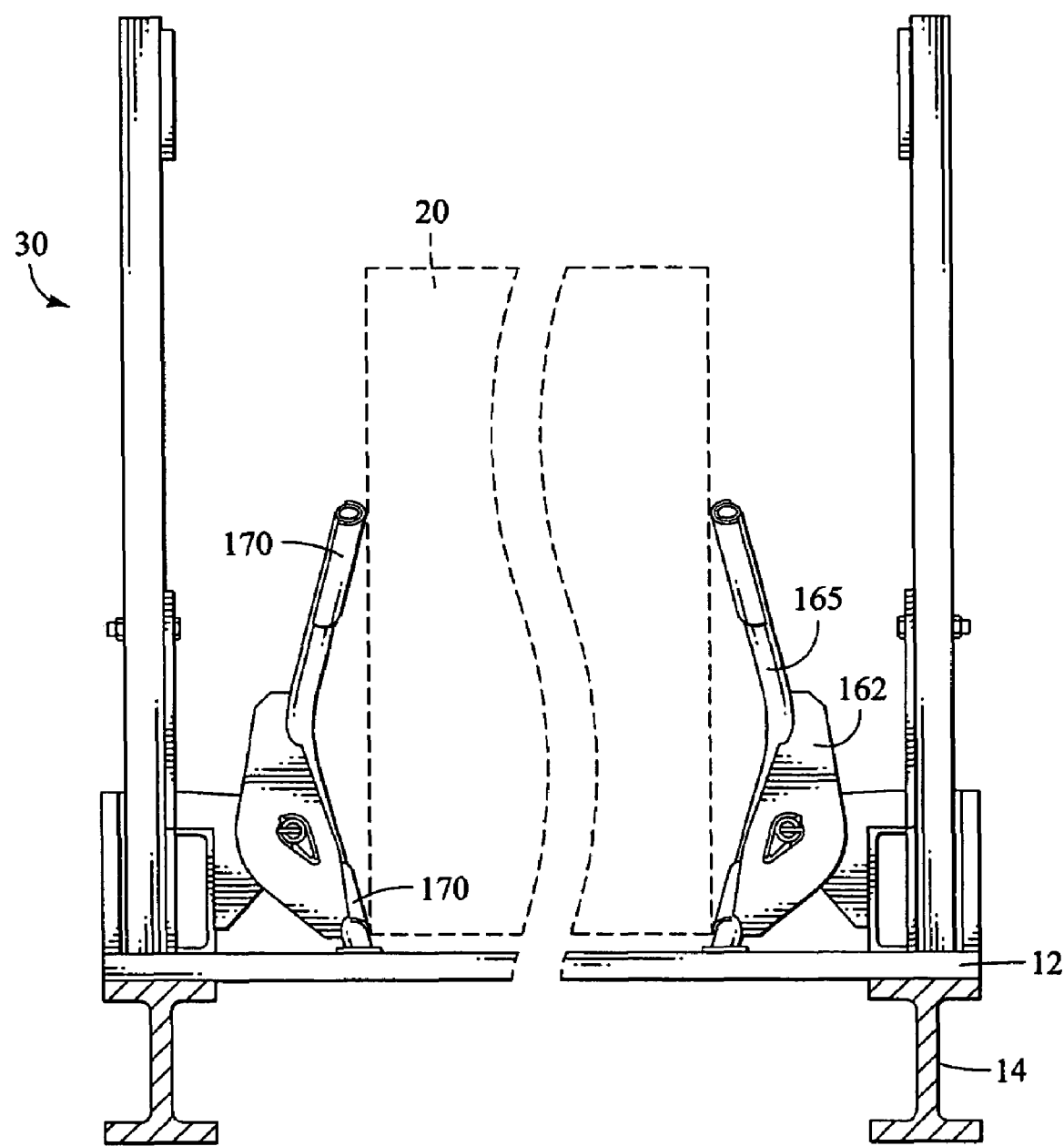
FIG. 12 is a side view of a pair of clamping mechanisms of a second embodiment securing a cylindrical load.
Figure 13:
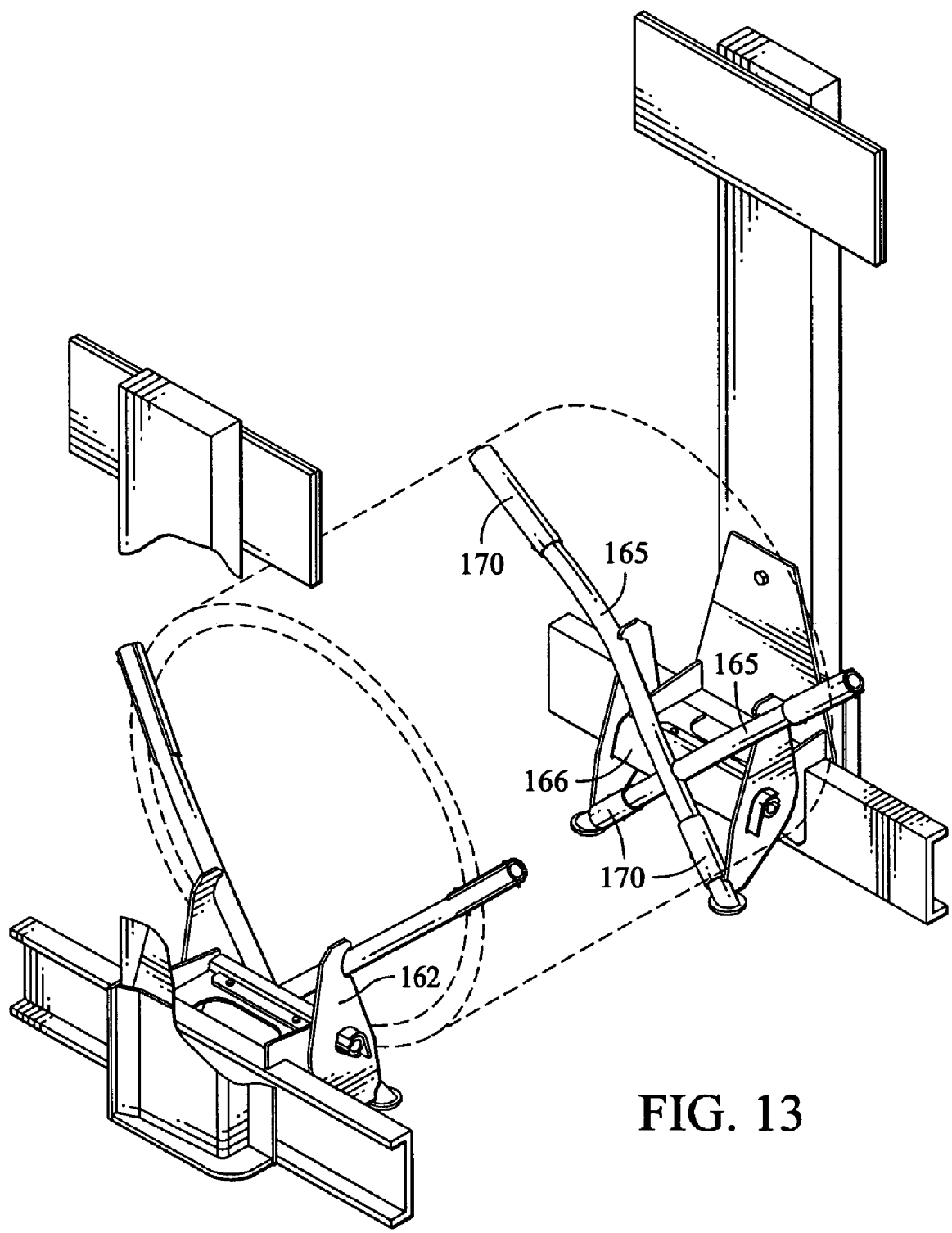
FIG. 13 is a top perspective view of the clamping mechanisms securing a cylindrical load.
Figure 14:
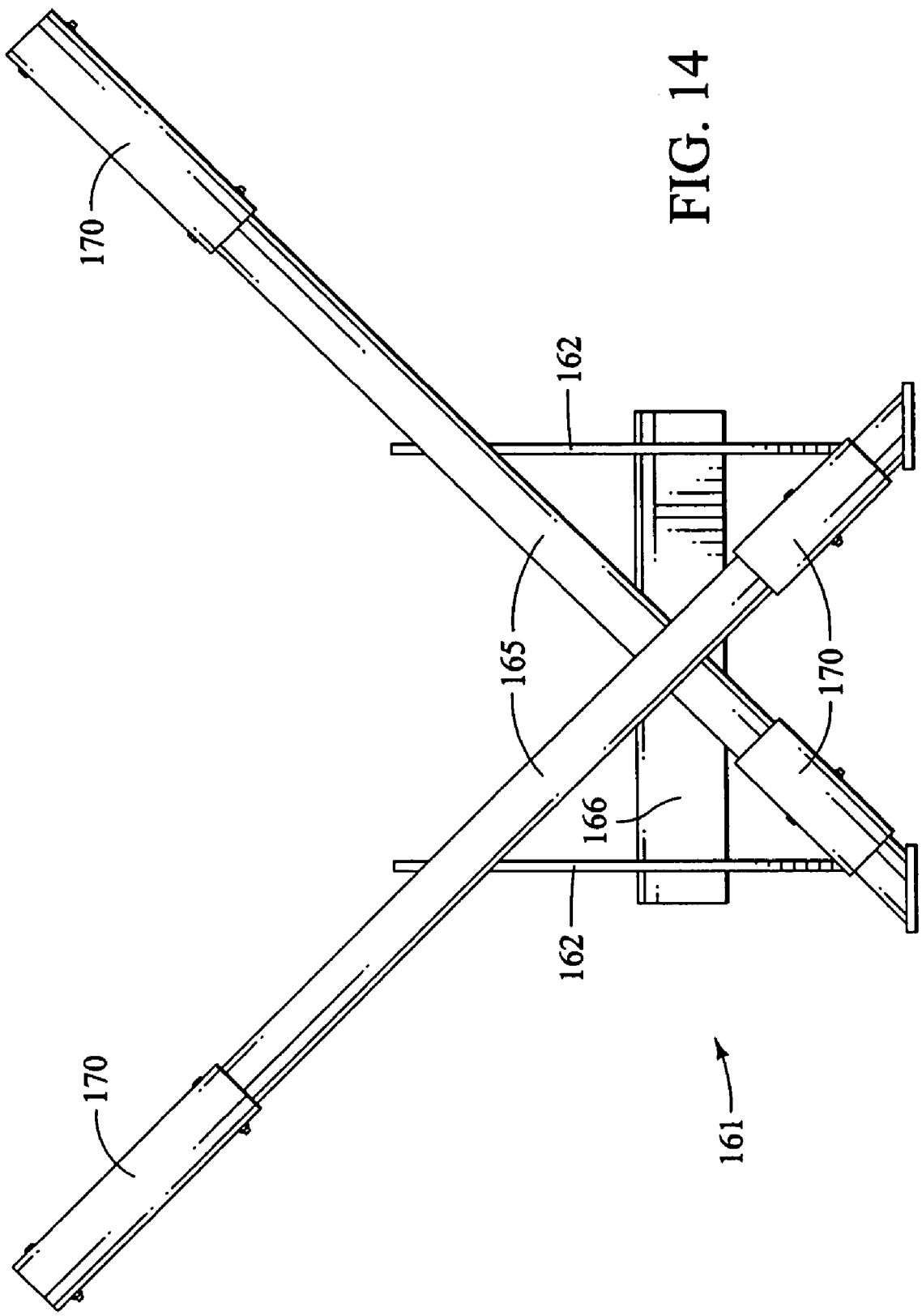
FIG. 14 is a front view of the clamping mechanism of a second embodiment.
Figure 15:
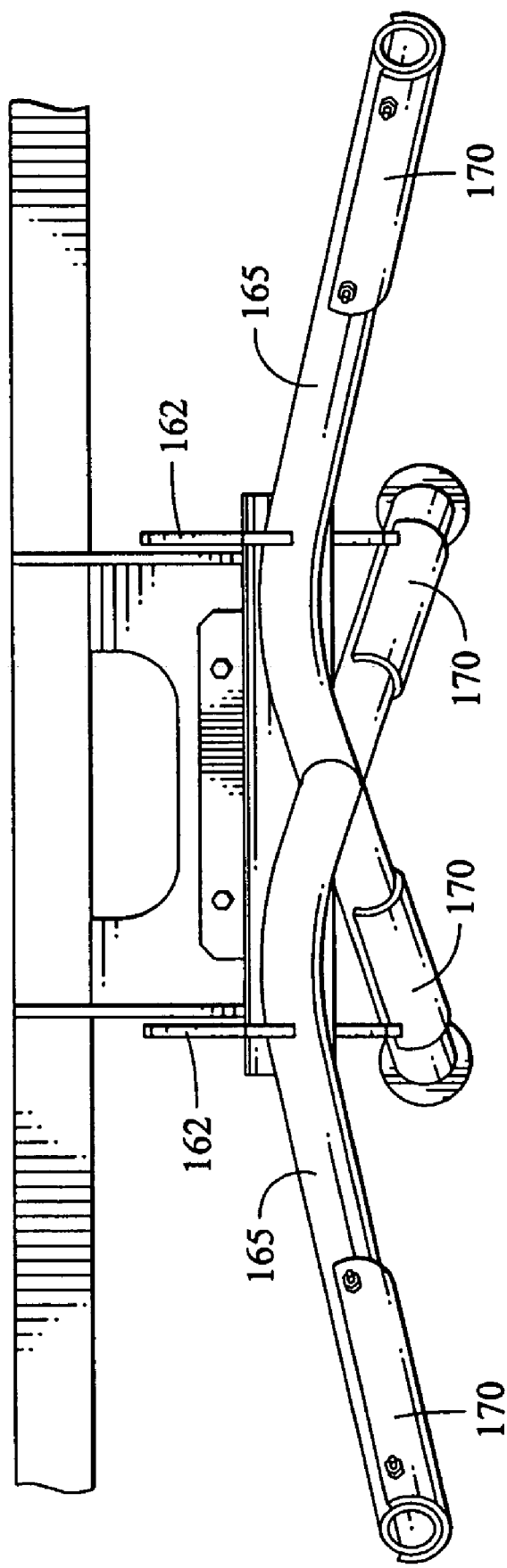
FIG. 15 is a top view of the clamping mechanism of a second embodiment.
Figure 16:
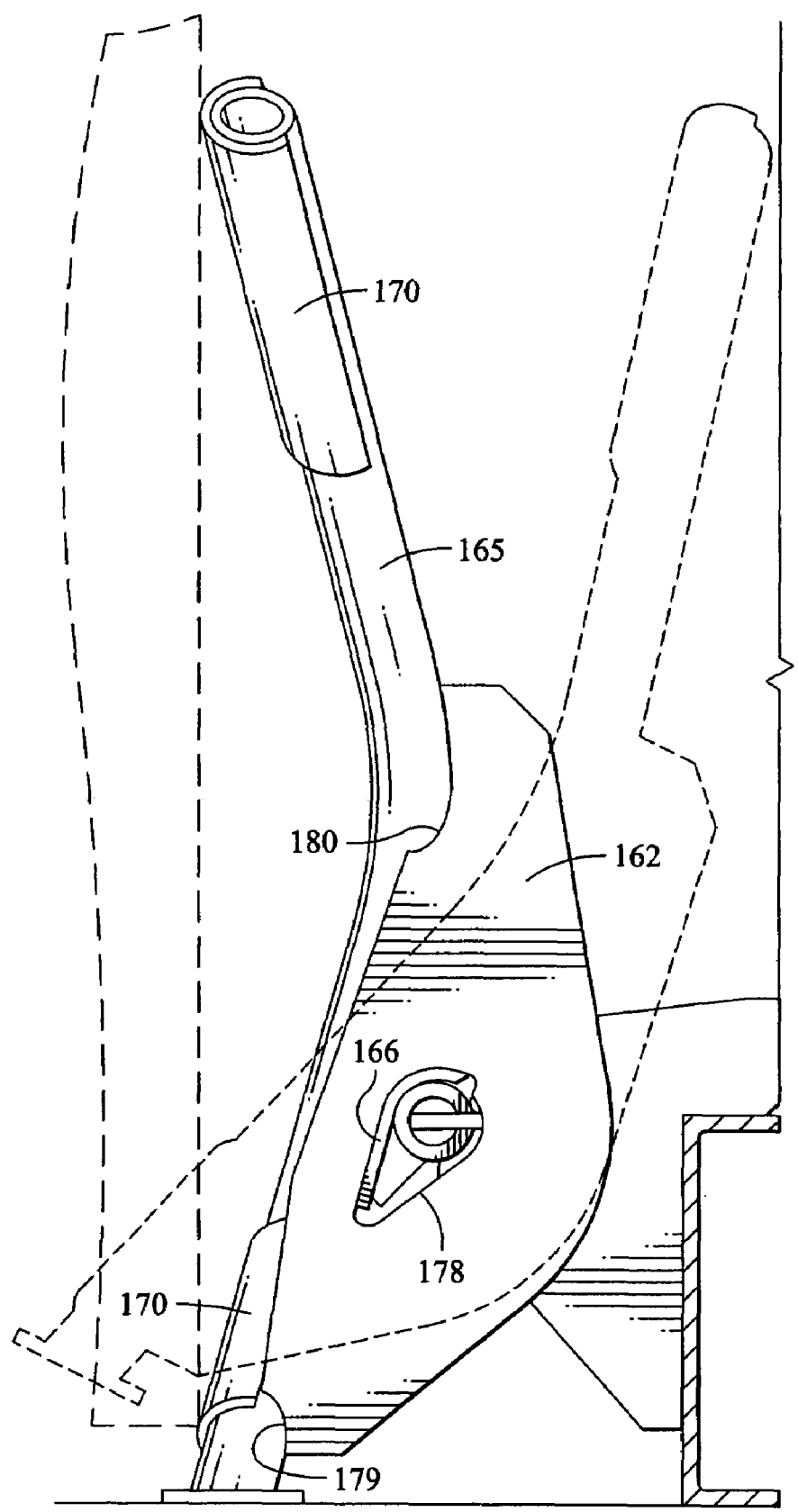
FIG. 16 is a side view of the clamping mechanism of a second embodiment at various positions.

Each bunk 50 includes a pair of spaced apart end members 52, as shown in FIG. 2. Preferably, the end members 52 are steel beams having C-shaped profiles in which the top flange 52a and bottom flange 52b face away from the long centerline of the railcar 10, as illustrated in FIG. 5. A pair of side members 58 is used to connect the end members 52, as shown in FIG. 2. Each side member 58 is connected to the distal end of each of the end members 52, and the side members 58 are spaced apart so as to form a rectangular footprint atop the deck 12. Preferably, the ends of the side members 58 are attached to the end members 52 by a weld. Each end member 52 is preferably disposed outwardly from the respective clamping mechanism 60, and the side members 58 are positioned at least partially between the opposed clamping mechanisms 60 to span the gap between the mechanisms. The end members 52 are spaced about 94 inches apart and the side members 58 are spaced about 55 inches apart. The dimensions of the bunks 50 are configured to be able to seat a variety of sizes of cylindrical loads 20, but can also be configured to seat any shape or size freight. The opposing side members 58 are secured to the end members 52 at about a 45 degree angle with respect to a vertical axis, thereby forming a v-shaped seat as shown in FIG. 17. In an alternative embodiment, as shown in FIG. 11, the side members 58 can be triangular tubes. A buffer 54 is secured to each of the side members 58. The buffers 54 likewise form a v-shaped seat and provide two parallel lines of contact along the length of its sides with the buffers 54. The buffers 54 are preferably attached to the side members 58 by a plurality of bolts. The buffers 54 are preferably made of wood, but any other material sufficient to prevent damage to the cylindrical loads 20 during transportation can be used, including, but not limited to, foam, cardboard, neoprene or plastic. The side members 58 are preferably of a square cross-section, but can also be curved so as to provide more contact with a cylindrical load 20 (not shown). In an alternative embodiment, the side members 58 in contact with a cylindrical load 20 can be a structure that is generally semicircular-shaped, spanning the entire width of the bunk 50, and contacts the entire length of the lower portion of the cylindrical load 20 as opposed to only two lines of contact.

FIG. 3 is an illustration of stacked rows of cylindrical loads 20 seated in the bunks 50 along a section of the length of the railcar 10. An advantage of having a two-layer stacking system for the cylindrical loads 20 is that more quantity can be shipped on each railcar 10. A problem commonly associated with transporting the cylindrical loads 20 in a stacked formation is that if one layer collapses due to shifting en route, it may cause the other layer to collapse as well, thereby risking damage to the entire payload. A pair of opposed clamping mechanisms 60 are designed to prevent such shifting of the lower layer during transport by reducing the lateral void space beyond the edges of the cylindrical loads 20, thereby stabilizing the upper layer. Each clamping mechanism 60 is preferably comprised of a clamp 61, a pivot 67, a divider 72, a u-shaped brace 73 and a pair of brackets 74, as illustrated in FIG. 5.

Figure 6:
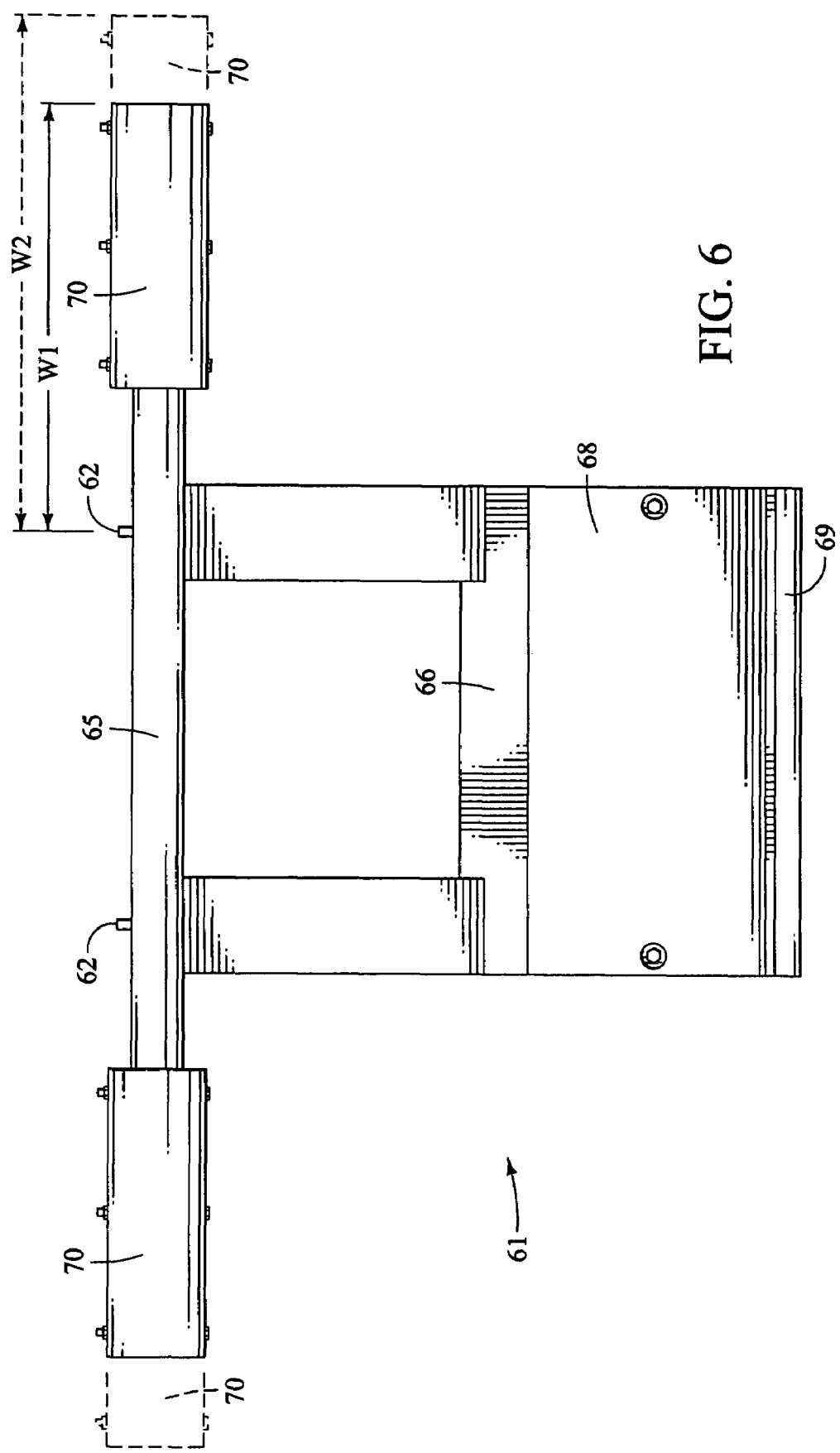
FIG. 6 is a front view of the clamp.

Each pair of opposed clamping mechanisms 60 is used to secure a cylindrical load 20 on the bottom row during transport, as shown in FIGS. 5-6. Each clamping mechanism 60 has an inwardly facing clamp 61. Each clamp 61 may move between an open and a closed position as shown in FIGS. 4A and 4B, respectively. Each clamp 61 has an open position in which the upper portion of the clamp 61 is rotated away from the long centerline of the railcar 10. In other words, when the upper portion of the clamp 61 is rotated outwardly toward the side post 30, the clamp 61 is in the open position. The closed position occurs when the upper portion is rotated inwardly toward the long centerline of the railcar 10, and is in contact with the edge of the cylindrical load 20. Preferably, when each clamp 61 is in the closed position, the upper portion of the clamp 61 is applying an axial load to a cylindrical load 20.

Figure 7:
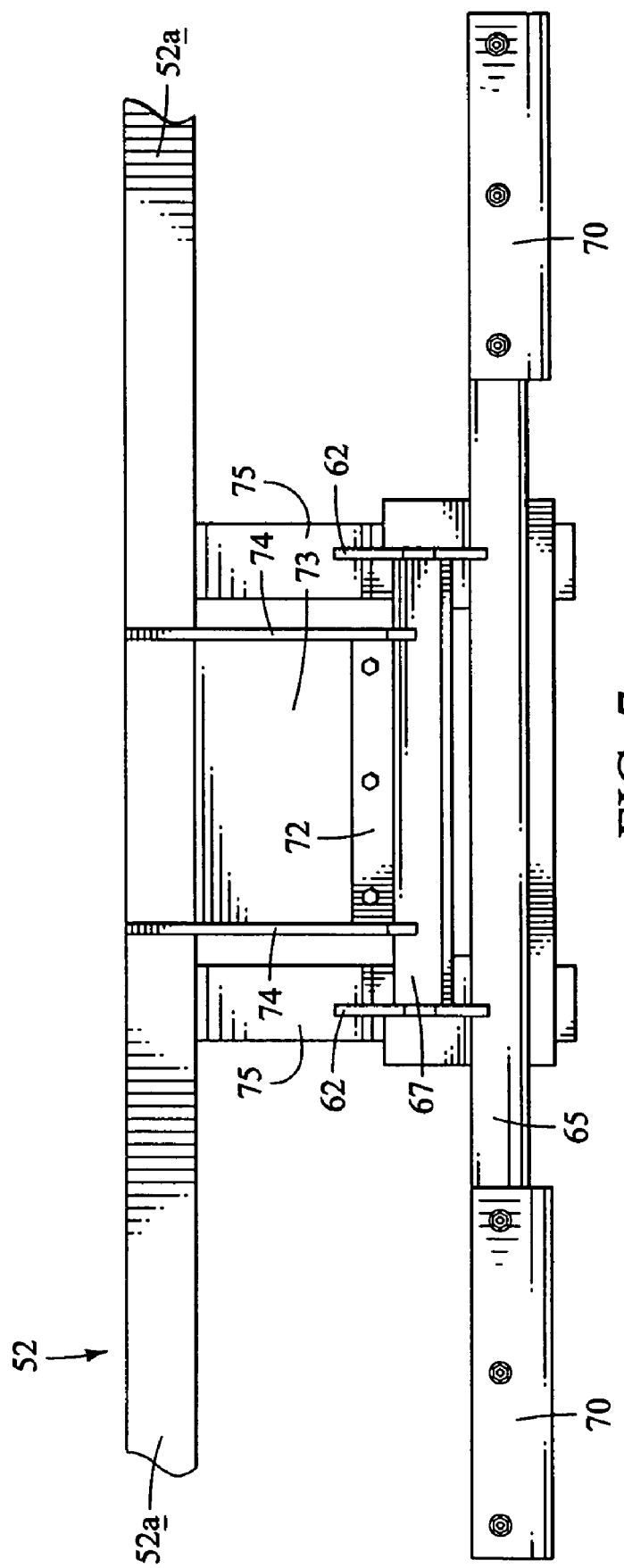
FIG. 7 is a top view of the clamping mechanism.
Figure 8:
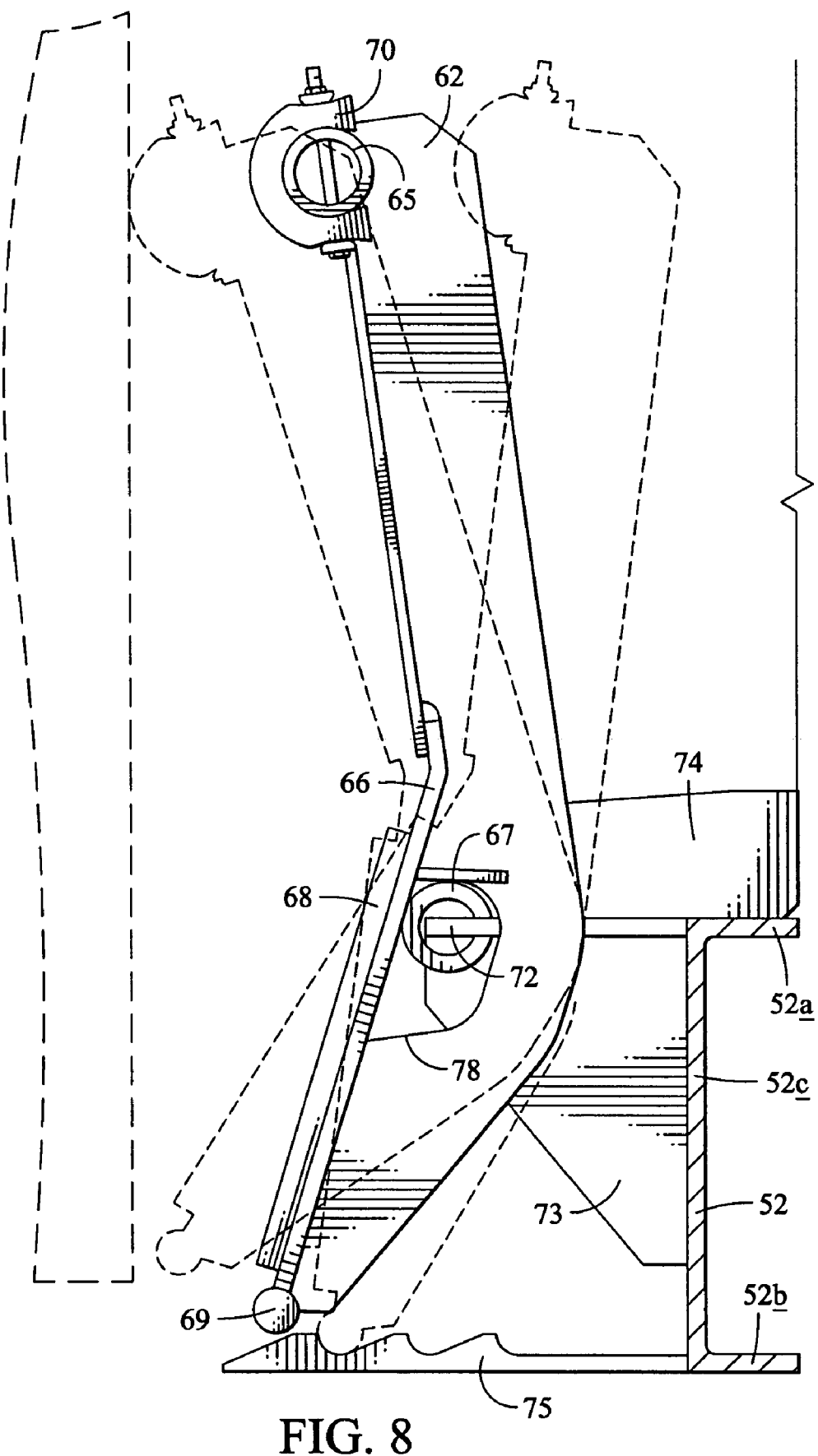
FIG. 8 is a side view of the clamping mechanism illustrating various positions.
Figure 10:
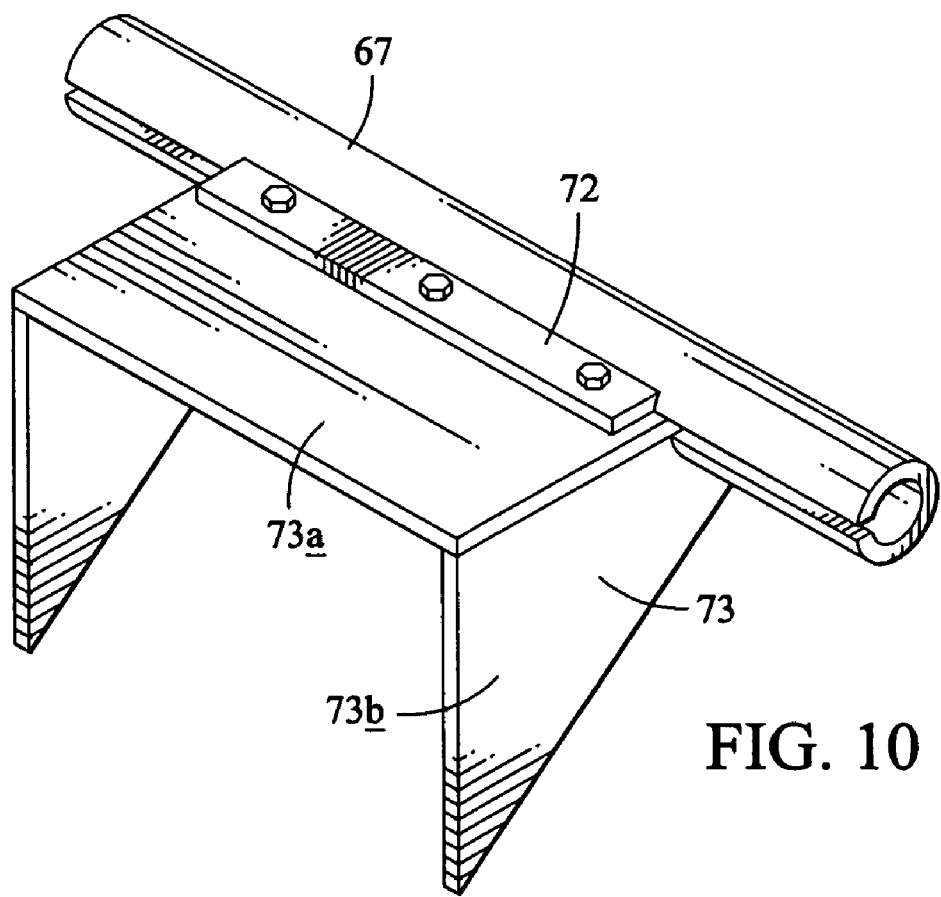
FIG. 10 is a perspective view of a pivot and associated brackets.

Each clamp 61 of the preferred embodiment is rotatable about a pivot 67, as shown in FIG. 8. In the preferred embodiment, the pivot 67 is connected to the side post 30 and the end member 52 by a series of structural, reinforced brackets 73, 74 attached only to an end member 52, as shown in FIGS. 5, 7, and 10. Each clamp 61 has a pair of arms 62, each arm 62 having an upper portion and a lower portion, wherein a lateral retaining beam 65 is connected at the upper distal end of each arm 62 and a placing member 66 is attached to the lower distal end of each arm 62.

A pair of opposed clamping mechanisms 60 secures a cylindrical load 20 along the bottom row of cylindrical loads 20 and provide an axial pressure on the edges of each cylindrical load 20. Because of the various lengths of cylindrical loads 20, each clamping mechanism 60 must be configured to receive the different lengths of cylindrical loads 20 or other shapes and sizes of freight. When the cylindrical load 20 is of a sufficient length so that as it is seated in the bunk 50, the lower edge of the cylindrical load 20 contacts the lower portion of each clamp 61, a lever action is created about the pivot 67 thereby causing the upper portion of each clamp 61 to rotate inwardly until each lateral retaining beam 65 contacts the edges of the cylindrical load 20, as shown in FIGS. 4A and 4B. When the cylindrical load 20 is removed from the bunk 50, the upper portion of the clamp 61 rotates away from the long centerline of the railcar 10 because the clamp 61 is top-heavy. Thus, each clamp 61 tends to an open position unless a cylindrical load 20 of sufficient length is seated between a pair of opposed clamping mechanisms 60. The weight of the cylindrical load 20 itself acts to secure the load during transport. The lever action of the clamping mechanism 60 transfers the vertical force of the cylindrical load 20 into an axial pressure on the load. When the cylindrical load 20 is not of a sufficient length to cause the lever action of the opposed clamps 61 when the cylindrical load 20 is seated, the opposed clamps 61 may be manually rotated until the lateral retaining beam 65 of each clamp 61 contacts the associated edge of the cylindrical load 20. A conventional ratcheting lock system including a rack 75 may be attached to the deck 12, as shown in FIGS. 4A-4B, of the railcar 10 beneath the clamping mechanism 60 in order to assist in maintaining the contact between each lateral retaining beam 65 and cylindrical load 20 having an insufficient length to force the clamps 61 to a closed position. A pinion member 69 is configured to slide along the top surface of the rack 75 as the clamp 61 is manually adjusted toward the closed position. The pinion member 69 passes over more notches in the rack 75 the further the clamp 61 must be rotated toward a closed position. Once the lateral retaining beam 65 has contacted the cylindrical load 20, the force exerted on the upper portion of the clamp 61 from the cylindrical load 20 acts to ensure that the pinion member 69 remains seated in a notch in the rack 75.

Each clamp 61 has two vertically oriented arms 62 spaced about 16 inches apart, as illustrated in FIGS. 6-8. Each clamp 61 has an upper portion and a lower portion which are above and below the pivot 67, respectively. The clamp 61 is not physically connected to the pivot 67, but instead the clamp 61 has a frictional relationship with the pivot 67 as the clamp rotates.

Figure 9:
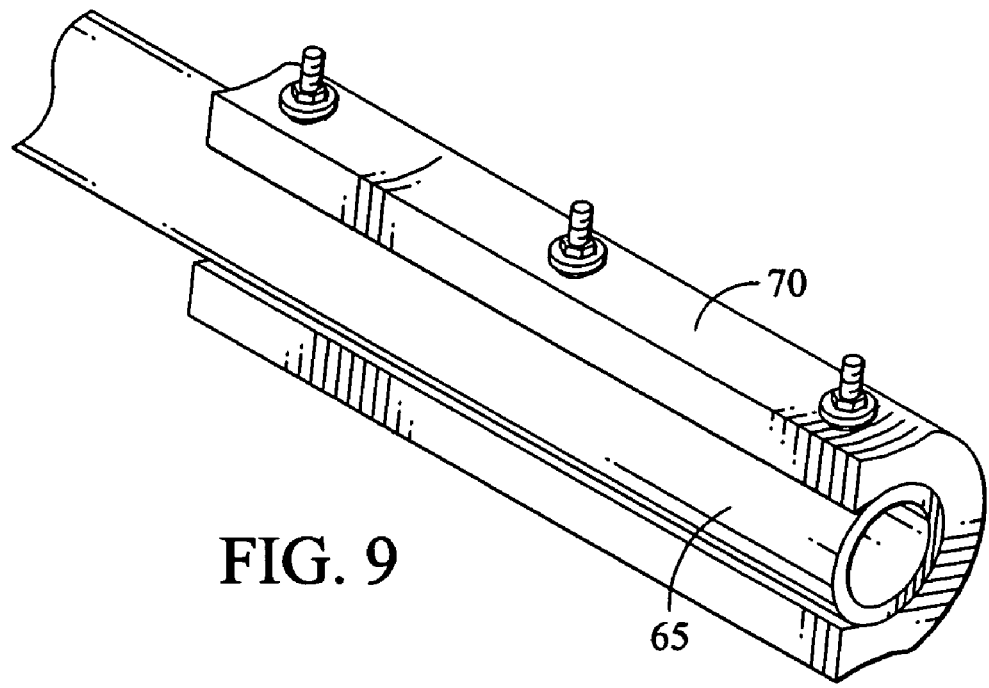
FIG. 9 is a top perspective view of a contact member and lateral retaining beam that contacts the cylindrical loads.

The upper portion of the clamp 61 includes a lateral retaining beam 65 attached to the upper distal end of both arms 62, as shown in FIGS. 6-8. The lateral retaining beam 65 is preferably a hollow steel tube with a length of 53 inches, an outside radius of 2 inches and a wall thickness of ⅜ inches. The length of the lateral retaining beam 65 must be of a sufficient length to ensure contact with the edge of a cylindrical load 20 with a nominal length of about 74 inches. In an alternative embodiment, the lateral retaining beam 65 could be expandable in length to allow contact with the edge cylindrical loads 20 of various sizes by an expandable telescoping arm extending axially along the length of the lateral retaining beam 65, as shown in FIG. 6. Although a hollow tube is preferred for the lateral retaining beam 65, a solid bar can also be used. The lateral retaining beam 65 is preferably attached to the spaced apart arms 62 by a weld. A contact member 70 is preferably attached at each end of the lateral retaining beam 65 in order to provide a cushion for contact with a cylindrical load 20, as shown in FIG. 9. The contact members 70 are attached to the lateral retaining beam 65 by several bolts. In an alternative embodiment, the contact member 70 can span the entire length of the retaining beams 65. Preferably, each contact member 70 is formed from neoprene and shaped about the outer surface of the lateral retaining beam 65, covering half of the circumference of the lateral retaining beam 65 facing inwardly. The contact members 70 can also be made of wood, plastic, or a material pliable enough to be formed about the outer surface of the retaining bar 65 and prevent damage to the cylindrical loads 20 to which they contact.

The lower portion of the clamp 61 includes a placing member 66 that spans at least the gap between both arms 62 of a clamp 61, as shown in FIG. 6. The placing member 66 is preferably attached to both arms 62 by a bolt, but can also be attached via a weld or a combination thereof. A protective barrier 68 is attached to the inward facing surface of the placing member 66 to provide a cushion when the cylindrical load 20 is seated in the bunk 50 and contacts the placing member 66. The protective barrier 68 is preferably attached to the placing member 66 with bolts. Any other means of attachment can be used, so long as the attachment means does not cause damage to the cylindrical load 20. The protective barrier 68 is preferably made of wood, but can also be made of any material sufficient to prevent damage to the cylindrical load 20 while loading, unloading, or during transport. The placing member 66 assists in centering the cylindrical load 20 between the opposed clamps 61. For example, if the cylindrical load 20 is being placed closer to one end of the bunk 50, it will contact the placing member 66 at that end of the bunk first, thereby causing the associated clamp 61 to rotate toward the closed position and applying an axial load to the cylindrical load 20. Because the cylindrical load is not yet set, the axial load applied from the one clamp 61 to the cylindrical load 20 forces the cylindrical load 20 toward the opposing clamping mechanism 60, thereby centering the cylindrical load 20 between the opposing ends of the bunk 50.

A pinion member 69 is attached along the bottom edge of the placing member 66 and between both arms 62, disposed below the bottom edge of the protective barrier 68, as illustrated in FIGS. 6-8. The pinion member 69 is preferably a cylindrical solid steel bar with a diameter of 1 inch. The pinion member 69 interfaces with the rack 75, thereby comprising a conventional rack-and-pinion locking mechanism.

Each clamp 61 preferably has two spaced apart arms 62. Each arm 62 defines a notch 78 along the inward-facing edge, as shown in FIG. 8. The notch 78 is formed by using a punch-press to remove a portion of the material, and also creating a lip extending transverse to the arm 62. The notch 78 formed in each arm 62 allows a portion of the pivot 67 to pass through the arms 62. While both arms 62 of a clamp 61 and the placing member 66 are rigidly connected to surround the pivot 67, the connection between each arm 62 and the pivot 67 is only by contact at the notch 78, thereby allowing the clamp 61 to freely rotate about the pivot 67. The notch 78 is configured to be larger than the circumference of the pivot 67, allowing the clamps 61 to be manually maneuvered along the rack 75 when a cylindrical load 20 of insufficient length is placed between opposing clamps 61, as will be discussed further.

The pivot 67 is preferably a steel hollow tube on which the clamp 61 rests and rotates about, as shown in FIGS. 8 and 10. Although a hollow tube is preferred, a solid steel cylindrical bar can also be used. The central axis of the pivot 67 is preferably parallel to the long centerline of the railcar 10. Preferably, the pivot 67 is disposed inwardly of the end member 52. A cut is made along the entire length of the pivot 67, thereby creating a penannular tube, as shown in FIG. 10. The divider 72 is then inserted through the opening in the pivot 67, and attached thereto preferably by a weld, as shown in FIG. 8. The divider 72 is oriented so as to be attached to the horizontal surface 73a of the brace 73, as shown in FIG. 7. The divider 72 is preferably connected to the brace 73 with bolts. Bolts are used to allow the pivot 67 and clamp 61 to be easily removed for replacement or repair. Although bolting the divider 72 to the brace 73 is preferred, a weld or any other sufficient method of attachment can be used.

The brace 73 is disposed below the pivot 67 and divider 72 in order to provide support, as illustrated in FIG. 10. The brace 73 is an inverted u-shaped member with a horizontal surface 73a and a pair of support walls 73b extending downwardly from the horizontal surface 73a. The vertical edges of the u-shaped brace 73 are connected to the vertical flange 52c of an end member 52. The horizontal surface 73a of the brace 73 extends inwardly from the end member 52 towards the long centerline of the railcar 10. The brace 73 provides triangulated support to the pivot 67 and the divider 72. The brace 73 is also connected to the pivot 67 preferably by a weld. The horizontal surface 73a of the brace 73 is aligned with the top flange 52a of the end member 52.

A pair of spaced apart brackets 74 also provides a connection between the pivot 67 and the end member 52 and the side post 30, as shown in FIGS. 7-8. The brackets 74 are disposed above the brace 73, and each bracket 74 is parallel with the brace support walls 73b. Preferably, the brackets 74 are attached to the pivot 67, the brace 73 and the top flange 52a by a weld.

Generally, when the length of a cylindrical load 20 is less than about 74 inches, the load is too small to contact each clamp 61 on opposite sides of the bunk 50. Thus, in order to secure the cylindrical load 20, the clamps are configured to be manually adjusted so as to provide sufficient contact between the clamps 61 and the edge. Each clamp 61 has a pinion member 69 disposed along the bottom edge of the placing member 66 and arms 62. Below the clamp 61, attached to the deck 12 of the railcar 20, the rack 75 is positioned to receive the pinion member 69, as shown in FIGS. 4A-4B. Each notch 78 in both arms 62 of each clamp 61 has enough tolerance to allow the clamp 61 to be maneuvered vertically so as to seat the pinion member 69 within one of the recesses in the rack 75 thereby providing a securing contact between each clamp 61 and the cylindrical load 20.

For example, when a cylindrical load 20 with an axial length of 70 inches is seated between the opposing clamps 61, the edges of the cylindrical load 20 do not contact the lower portion of either of the opposed clamps 61. The top portion of each clamp 61 is thus manually rotated inwardly toward the long centerline of the railcar 10 until the contact members 70 of both clamps 61 contact the respective ends of the cylindrical load 20. As each clamp 61 is rotated inwardly, the pinion member 69 on the clamp 61 becomes set in the first inlet of the rack 75. As the pinion member 69 slides along the first inclined surface of the rack 75, the clamp 61 is raised slightly in the vertical direction, whereby each clamp is slightly displaced vertically with respect to the stationary pivot 67. Once the contact members 70 of a clamp 61 are in contact with the cylindrical load 20 thereby applying an axial load thereto, the pinion member 69 is set in the inlet of the rack 75, as shown in FIG. 8, and cannot be released except by manually forcing the clamp 61 to rotate such that the pinion member 69 is separated from the inlet of the rack 75.

The method of placing a cylindrical load 20 onto the railcar 10 involves the lifting of the load by either a crane or a forklift. The cylindrical load 20 is then lowered into the bunk 50. As the cylindrical load 20 is seated, it will first contact the protective barrier 68 covering the placing member 66 of the lower portion of each opposing clamp 61. As the edge of the cylindrical load 20 contacts the protective barrier 68, and the cylindrical load 20 is further lowered, both opposing clamps 61 rotate about their respective pivots 67 to a closed position until the contact members 70 of the lateral retaining beams 65 contact the edge of the cylindrical load 20, thereby securing the cylindrical load 20. The sides of the cylindrical load 20 will also contact the buffers 54 of each of the side members 58 of the bunk 50. Preferably, there are at least three points of contact between each clamp 61 and the edge of the cylindrical load 20, in addition to the contact between the outer surface of the cylindrical load 20 and the buffers 54 of the bunk 50. When removing the cylindrical load 20, the weight of the upper portion of each clamp 61 is of sufficient weight so that the upper portion will rotate outward toward the open position, and be ready to receive another cylindrical load 20.

In an alternative embodiment, each clamping mechanism 60 is attached directly to the deck of the railcar 10, or to the support beams 14 running the length of the railcar.

An alternative embodiment of the present invention is shown in FIGS. 12-16. Each clamp 161 includes a pair of spaced apart arms 162, a pair of angled cross members 165 with contact members 170 attached at both ends of each angled cross member 165, and a lateral support member 166. Each spaced apart arm 162 has a notch 178 located generally in the center of the arm 162 through which the pivot 67 passes, and a notch at both the upper and lower ends of each arm 162 to which an angled cross member 165 is attached. The lateral support member 166 is connected to both arms 162 of the clamp 161 via the inner surface of the notch 178 in each arm 162. Each angled cross member 165 is seated in the notch 179 defined at the lower distal end of one of the arms 162 of the clamp 162 and in the notch 180 defined at the upper distal end of the second spaced apart arm 161. A contact member 170 is attached to both the upper and lower distal ends of each angled cross member 165 to act as a cushion to prevent damage to the edge of a cylindrical load 20. The pair of angled cross members 165 forms a 90 degree angle as they cross just inwardly of the lateral support member 166. One of the angled cross members 165 must have a section cut out to allow the second angled cross member 165 to pass through at the intersection of the angled cross members 165. The angled cross members 165 are welded at the intersection. Each angled cross member 165 is about 51½ inches in length, and is formed of steel hollow tube stock with a diameter of 3½ inches and a wall thickness of ⅜ of an inch. Each angled cross member 165 is bent in generally the middle of the length of the angled cross member 165 at an angle of about 25 degrees. Each clamp 161 has at least four points of contact with the edge of a cylindrical load 20.

In an alternative embodiment, the clamping mechanisms 60 can be configured to secure a pallet with goods stacked atop the pallet. For example, several arms 62 can be connected at the top by a longer lateral retaining beam 65 and at the bottom by a larger placing member 66 that contacts a significant portion of the bottom edge of a pallet. In a further alternative embodiment, a rack of bunks 50 can be secured to the flatbed of a tractor-trailer used to haul freight. In another embodiment, the bunk 50 includes only side members 58 mounted to the deck 12 and the opposed clamping mechanisms 60 disposed in the stake pockets 40, wherein the side posts are positioned at least partially between the opposed clamping mechanisms 60.

The dimensions of the bunks 50 and the lengths of the cylindrical loads 20 are exemplary. The dimensions of the clamps are likewise exemplary, and those dimensions recited are also variable. The clamping mechanism 60 is configured to use the weight of the freight to secure it during transport. Thus, the clamping mechanism 60 can be used to secure any type of freight with a variety of shapes and sizes, and is not limited to securing only cylindrical loads.

Figure 18:
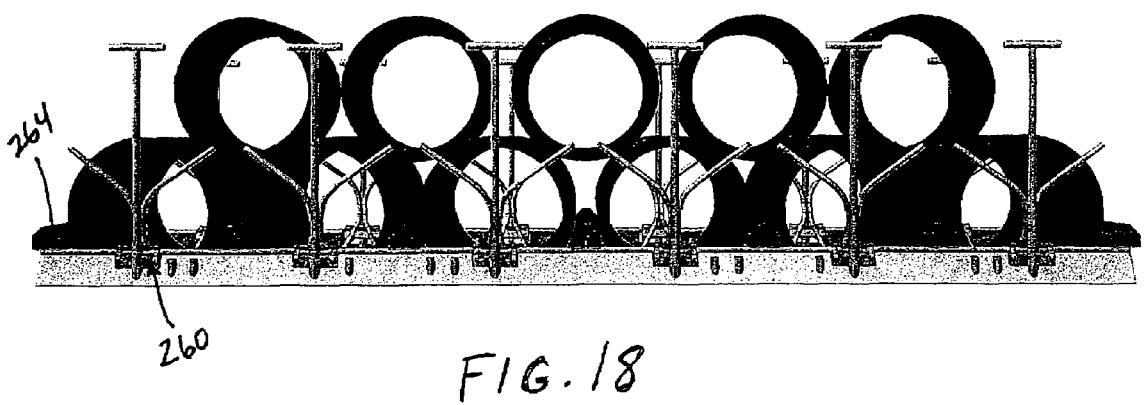
FIG. 18 is a side view of a third embodiment of the clamping mechanism attached to a railcar having freight disposed thereon.
Figure 19:
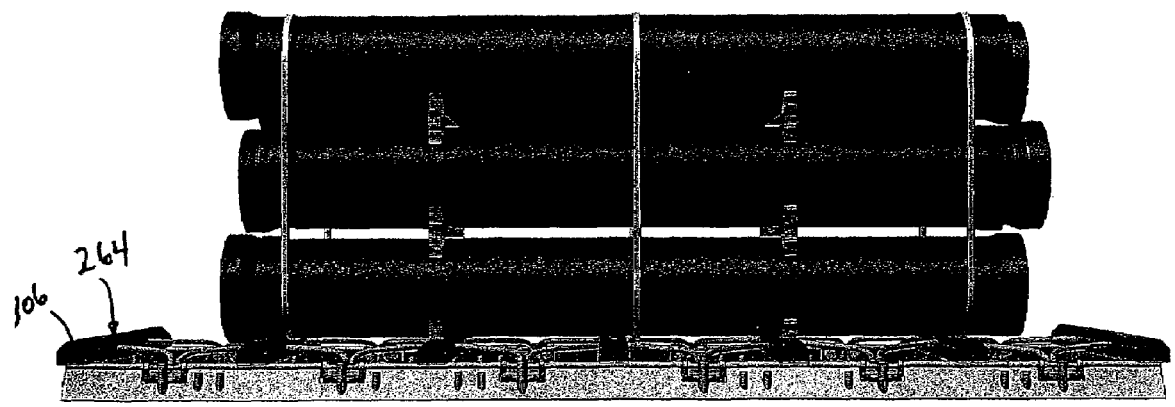
FIG. 19 is a side view of a railcar having the clamping mechanism of FIG. 18 in a stowed position.
Figure 20:
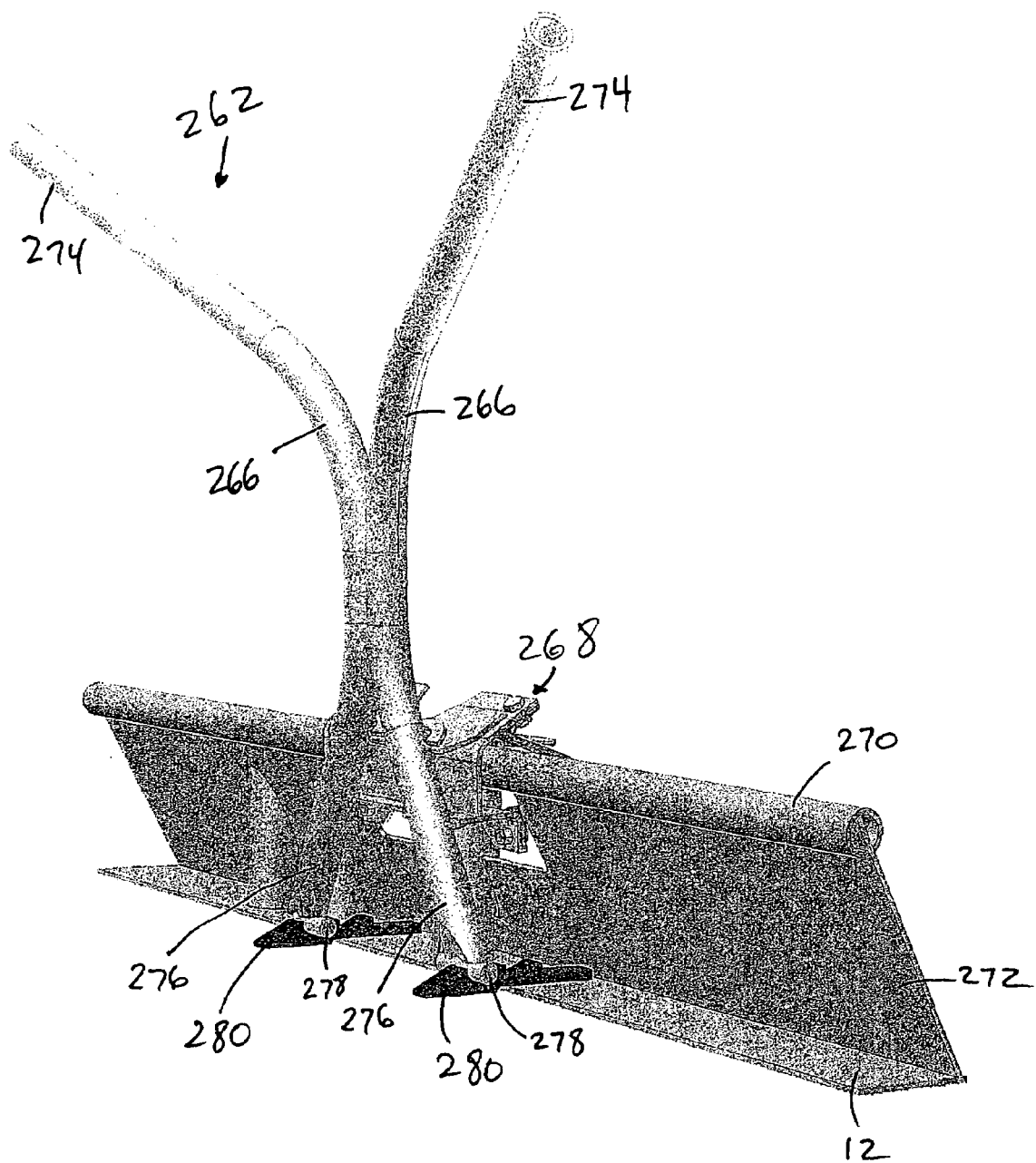
FIG. 20 is a perspective view of a third embodiment of the clamping mechanism.
Figure 21:
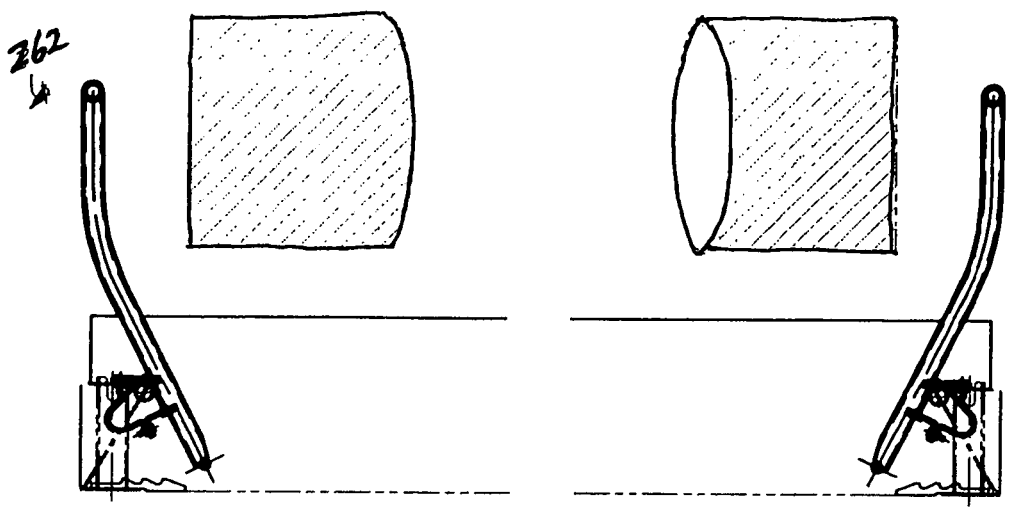
FIG. 21 is the clamping mechanism of FIG. 20 in an open position.
Figure 22:
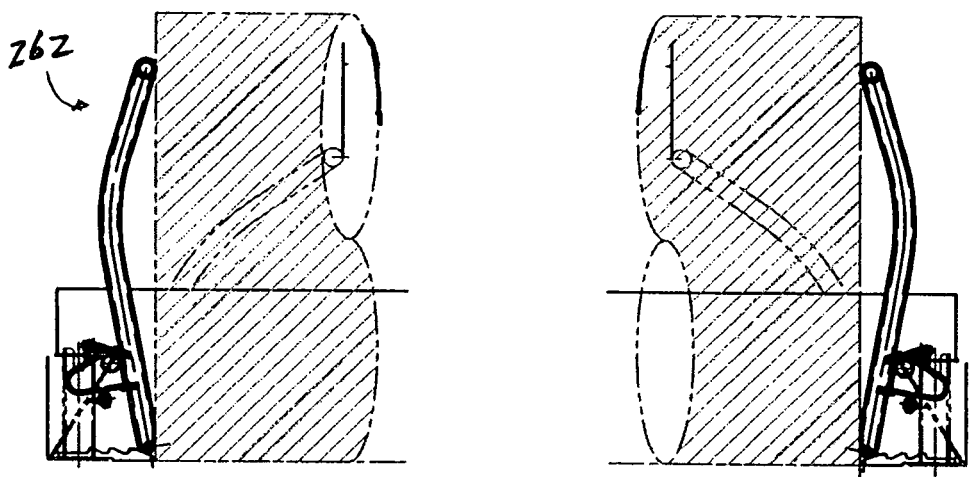
FIG. 22 is the clamping mechanism of FIG. 20 in a closed position.
Figure 23:
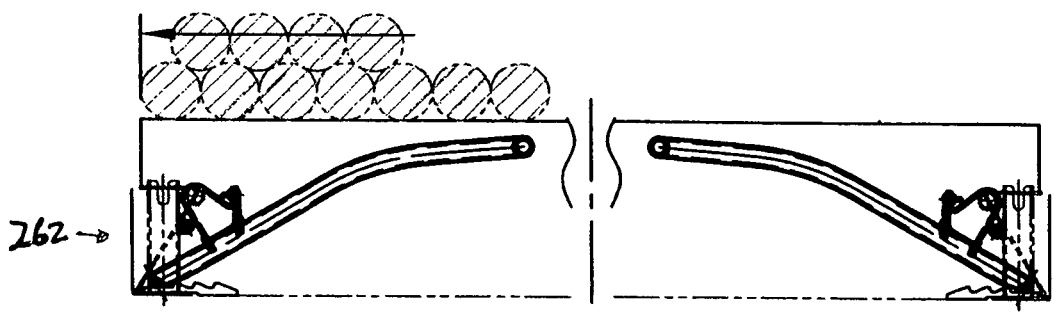
FIG. 23 is the clamping mechanism of FIG. 20 in a stowed position.

In a further alternative embodiment, the clamping mechanism 260 includes a pair of opposing clamps 262 operatively attached to a bunk 264, as shown in FIGS. 18-20. The clamps 262 are rotatable between a fully-opened position in which the clamps 262 are rotated outward, as illustrated in FIG. 21, a closed position in which the clamps 262 secure a cylindrical load 20, as illustrated in FIG. 22, and a stowed position in which the clamps 262 are rotated inward such that freight is loaded on a bunk 264 without interference with the clamps 262, as illustrated in FIG. 23.

Figure 24:
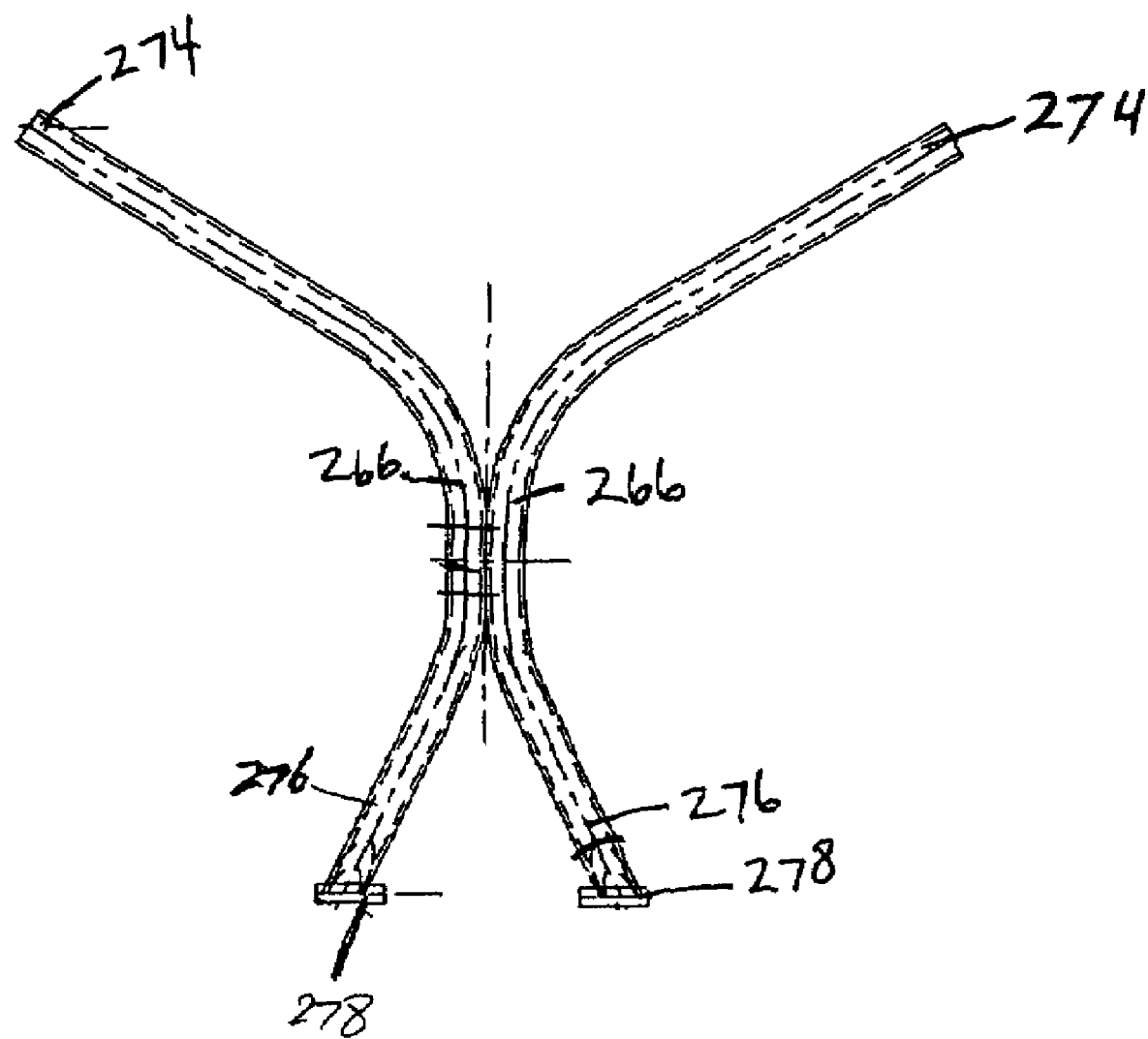
FIG. 24 is a clamp of the clamping mechanism of FIG. 20.

The clamping mechanism 260 includes a pair of opposing clamps 262, a pivot mechanism 268, and a fulcrum 270 attached to an end member 272 of a bunk 264, as shown in FIGS. 20 and 24. The clamp 262 further includes a pair of angled arms 266 having an upper portion 274, a lower portion 275, and a pinion member 276 operatively engaged with a rack 277. The arms 266 are connected at a proximal location, and the upper and lower portions 274, 275 extend at an angle therefrom. Each arm 266 is formed from a hollow, cylindrical tube, but each arm 266 can also be formed from a tube having any other shape sufficient to contact a cylindrical load 20.

Figure 25:
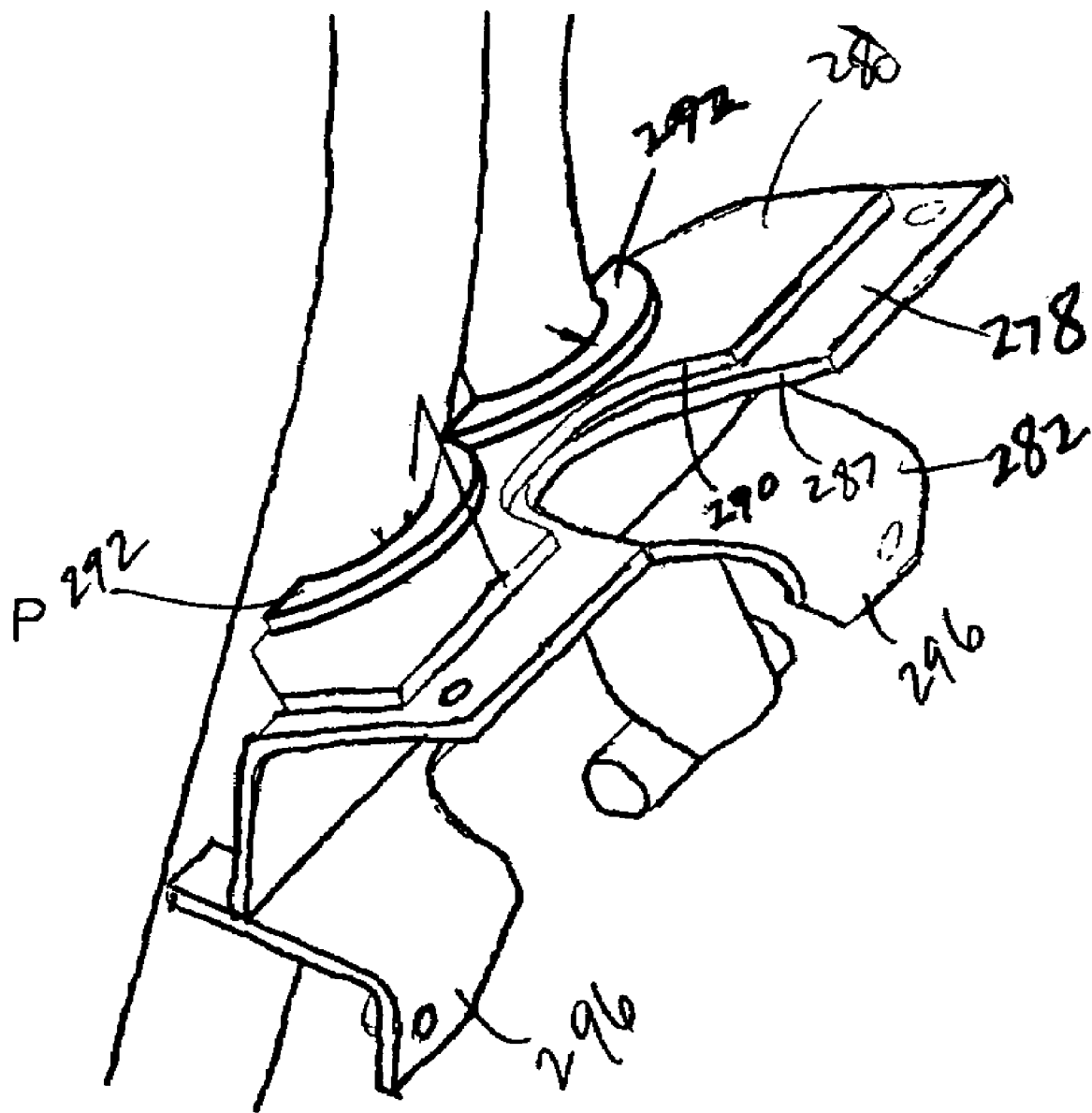
FIG. 25 is an enlarged view of the third embodiment of the clamping mechanism.
Figure 26:
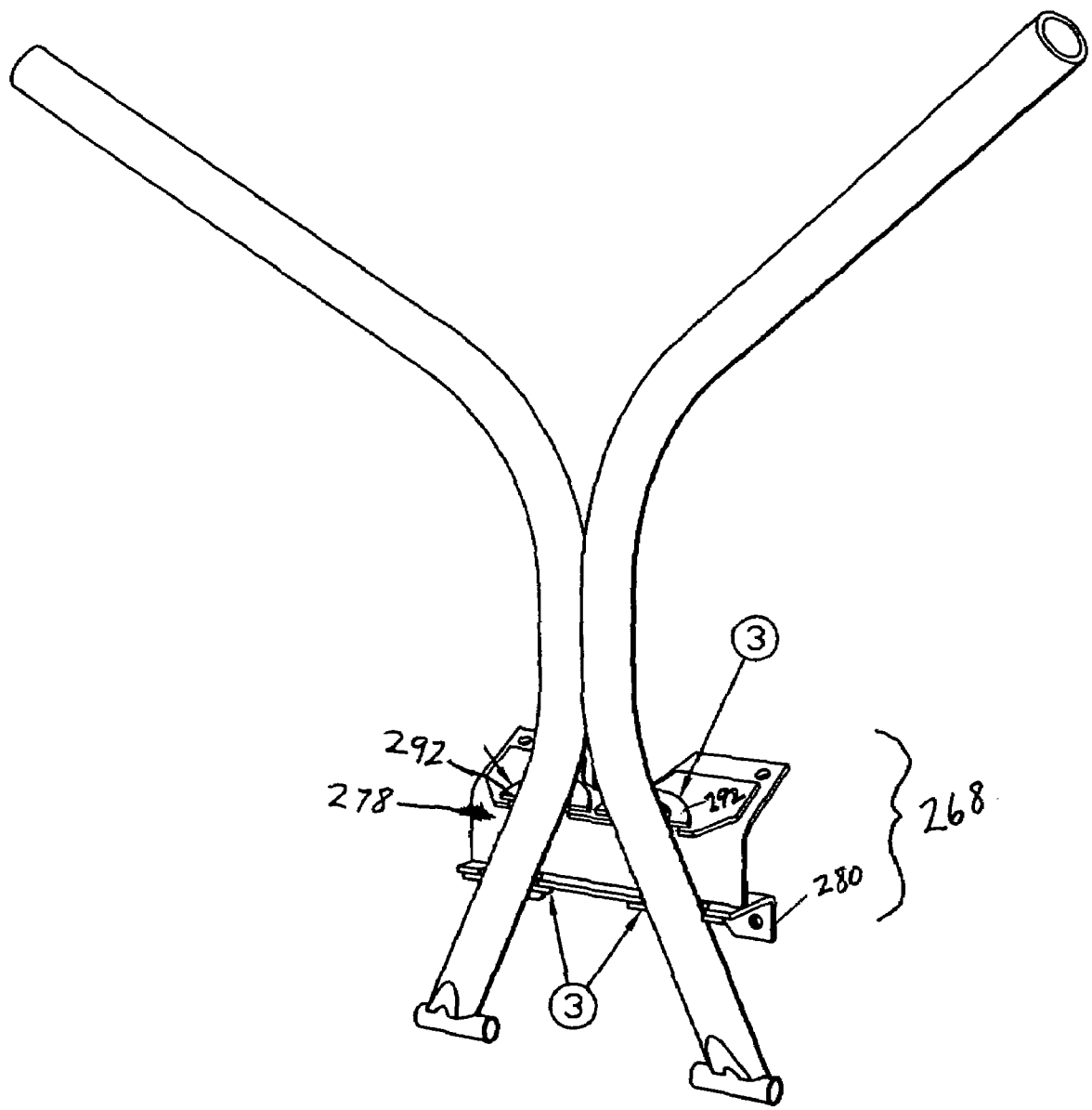
FIG. 26 is a perspective view of the third embodiment of the clamping mechanism.
Figure 27:
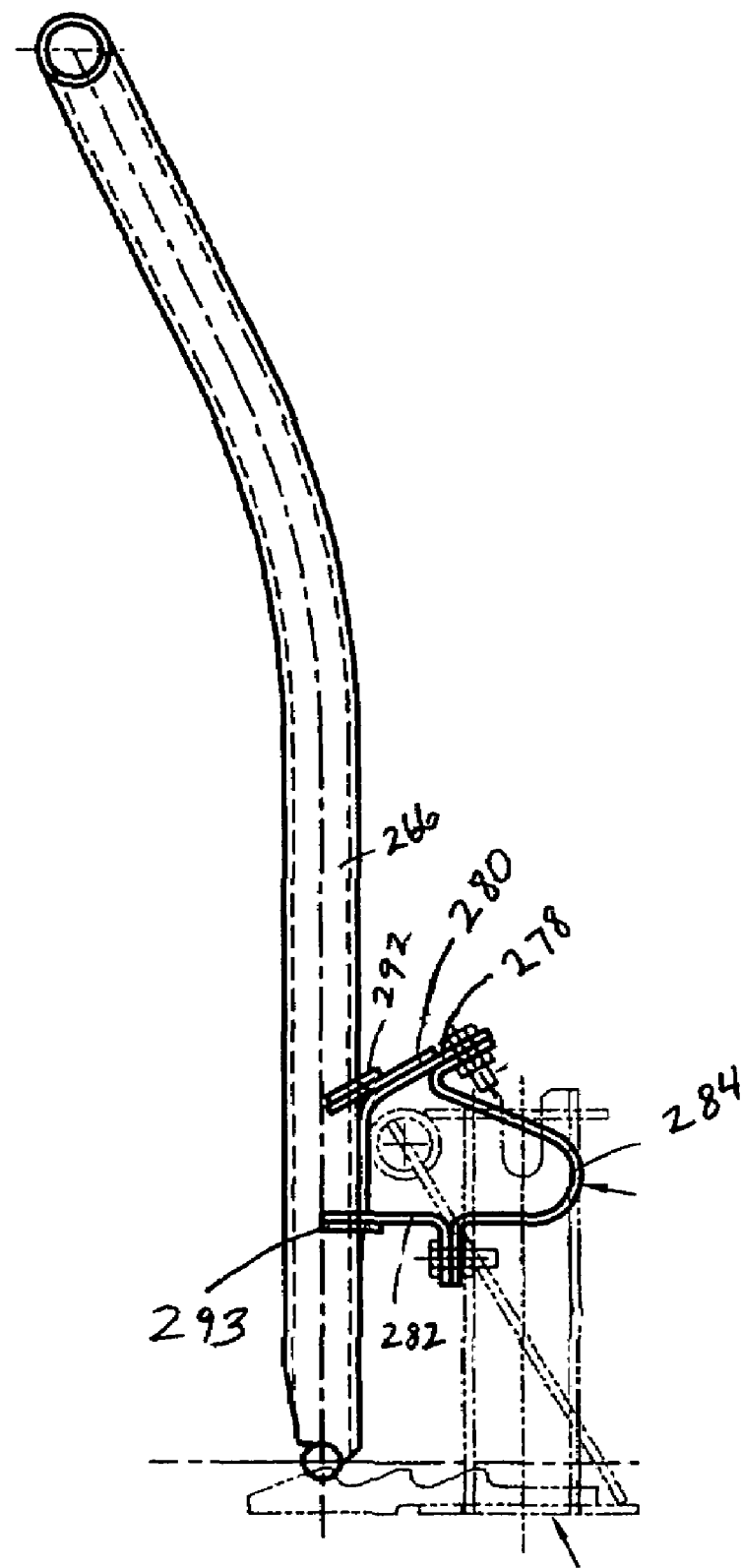
FIG. 27 is a side view of the third embodiment of the clamping mechanism.
Figure 28:
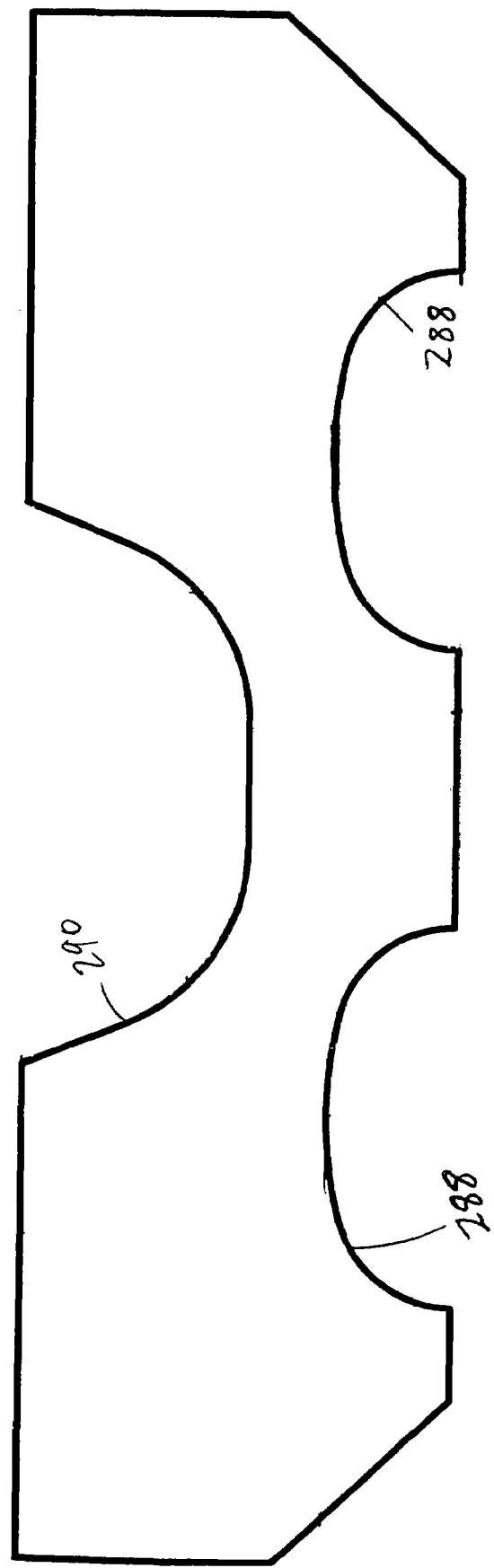
FIG. 28 is a top view of a top plate of the third embodiment of the clamping mechanism.
Figure 29:
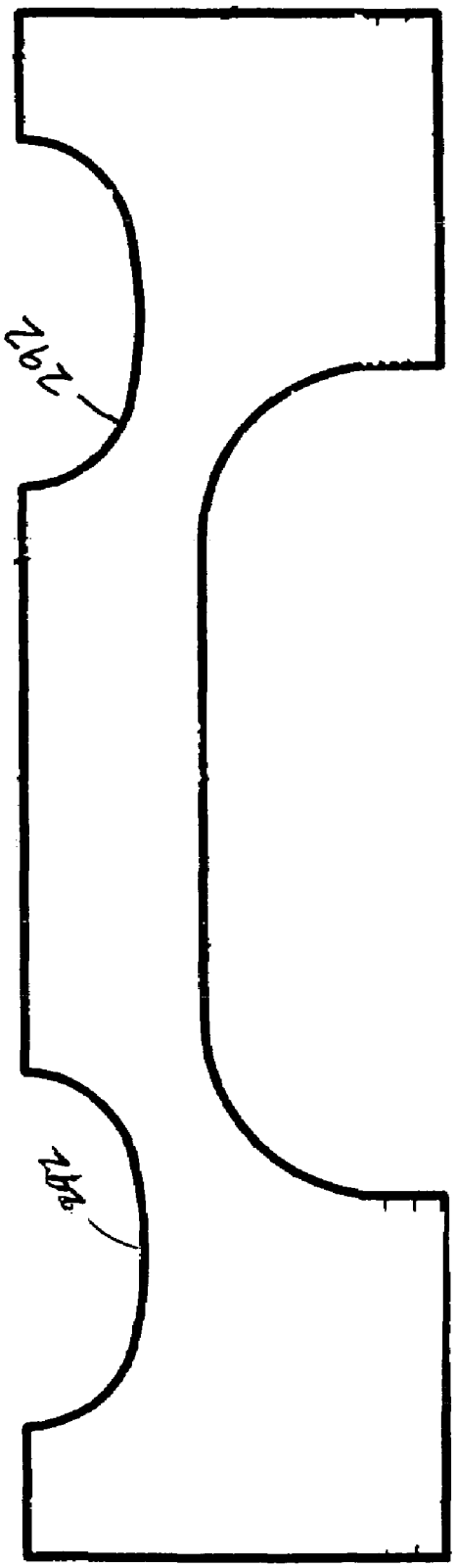
FIG. 29 is a top view of a bottom plate of the third embodiment of the clamping mechanism.
Figure 29A:
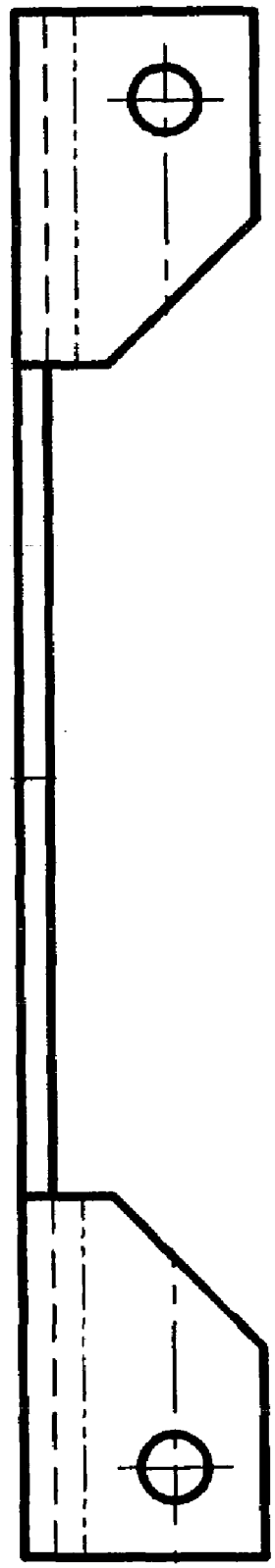
FIG. 29A is a rear view of the bottom plate of FIG. 29.

Each clamp 262 is operatively connected to a pivot mechanism 268, as illustrated in FIGS. 25-27. The pivot mechanism 268 includes a top plate 278, a top reinforcement 280, a bottom plate 282, and a pair of connecting straps 284. The top plate 278 is formed as an angled bracket such that one leg of the angled bracket is substantially parallel to the arms 266 of the clamp 262 to which it is connected and the second leg of the angled bracket extends rearward from the arms 266 of the clamp 262. The top plate 278 has a notch 286 formed in the leg extending from the arms 266, wherein the notch 286 allows the clamp 262 to be rotatable to an open position without interference from a side posts 30. The top reinforcement 280 is attached to the leg of the top plate 278 between the angled portion and the arms 266. The top reinforcement 280 is welded to the top plate 278 and the arms 266 of the clamp 262, but any other form of connecting the top reinforcement 280 to the top plate 278 and the arms 266 can be used. The top reinforcement 280, as shown in FIG. 28, has a pair of notches 288 formed on one edge to receive the arms 266 of the clamp 262 and another notch 290 formed on the opposing edge to allow the clamp 262 to be rotated toward an open position without interfering with a side post 30. A pair of securing members 292 are formed as half-circle pieces that are attached to the top reinforcement 280 and the arms 266 so as to ensure a secure engagement between the arms 266 and the top reinforcement 280.

The bottom plate 282 is an angled bracket that is attached to the arms 266 of the clamp 262 and the edge of the top plate 278 adjacent to the arms 266, as shown in FIGS. 25-27 and 29-29A. The bottom plate 282 has a pair of spaced-apart notches 294 in which the arms 266 of the clamp 262 are disposed. The bottom plate 282 is attached to the top plate 278 and both arms 266 of the clamp 262 by a weld, but any other securing mechanism to connect the bottom plate 282 to the top plate 278 and the arms 266 can be used. The bottom plate 282 extends from the arms 266 in a transverse direction such that the spaced-apart connecting portions 296 of the bottom plate 282 are oriented in a substantially parallel manner with the arms 266. A pair of securing members 292 are formed as half-circle pieces that are attached to the bottom plate 282 and the arms 266 so as to ensure a secure engagement between the arms 266 and the bottom plate 282.

Figure 30:
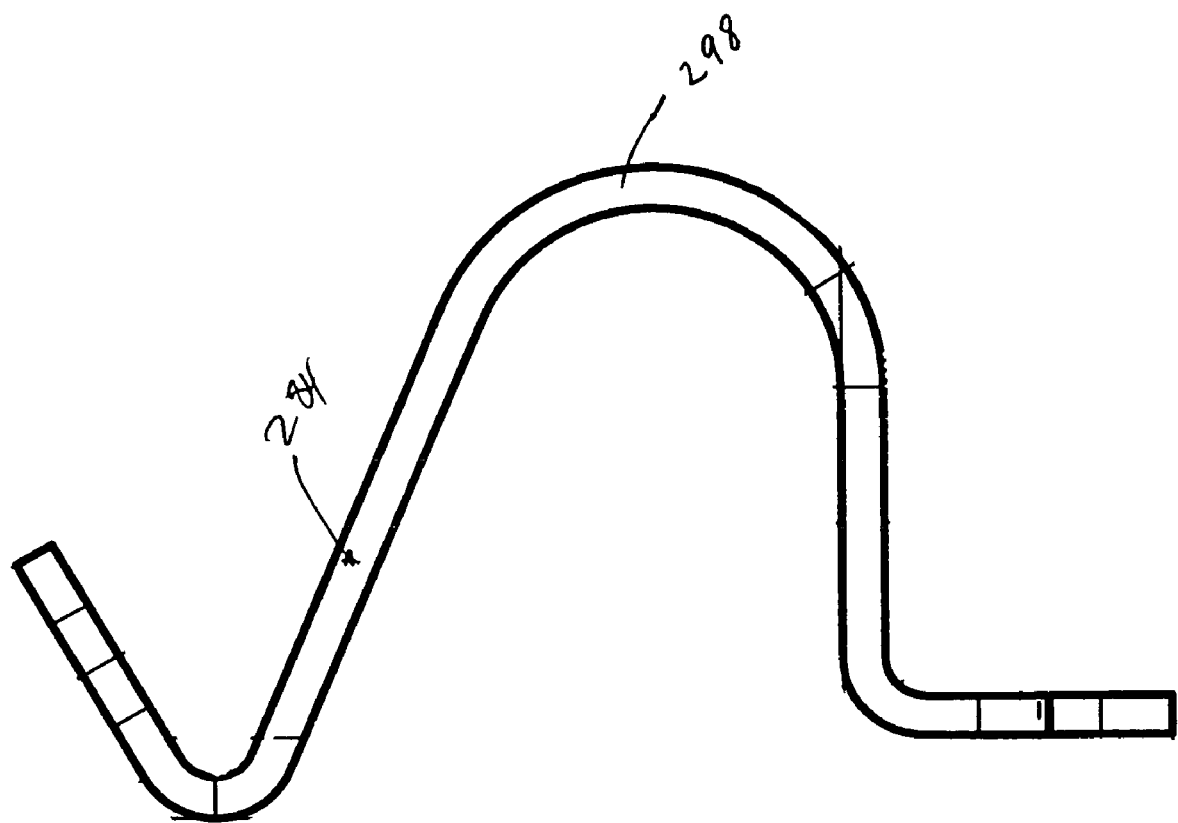
FIG. 30 is a side view of a connecting strap of the clamping mechanism of FIG. 26.

The top plate 278 is operatively attached to the bottom plate 282 by a pair of connecting straps 284, as shown in FIGS. 20 and 27. The connecting straps 284 are attached to the arm of the top plate 278 that extends away from the arms 266 as well as the connecting portions 296 of the bottom plate 282 by a bolt, thereby allowing the clamp 262 to be releasably connected to the bunk 264 such that the clamp 262 can be easily removed for replacement or repair. The connecting straps 284 are formed from a piece of metal, but any other material sufficient to withstand the stresses associated with the rotation of the clamp 262 can be used. As shown in FIGS. 28 and 30, the connecting strap 284 has a curved portion 298 located between the opposing distal ends of the connecting strap 284. The curved portion 298 of the connecting strap 284 ensures that the clamp 262 remains operatively engaged with the fulcrum 270 attached to the end member 272 of the bunk 264 as well as allowing the clamp 262 to be rotated forwardly to the stowed position.

Figure 31:
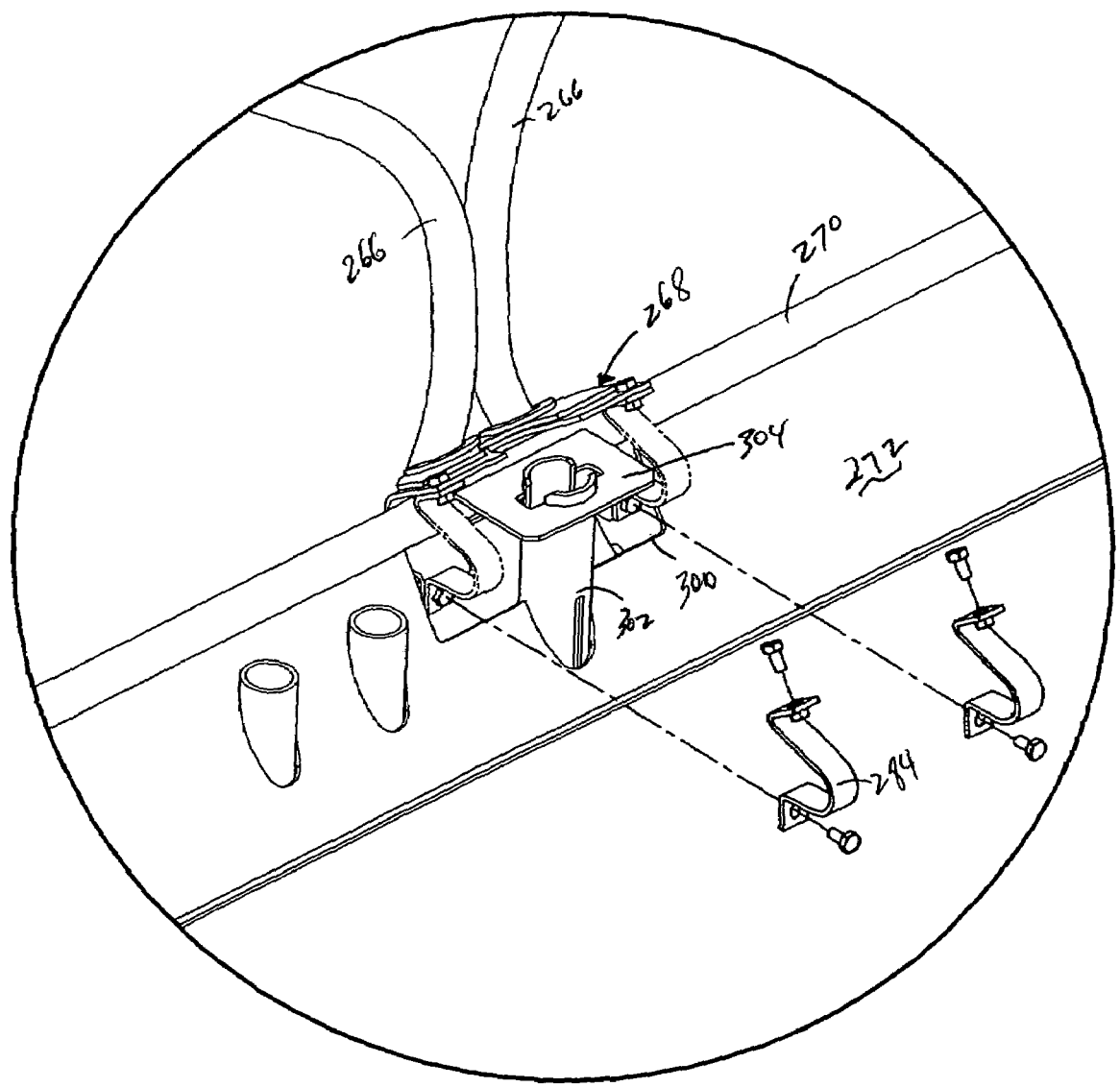
FIG. 31 is a perspective view of the third embodiment of the clamping mechanism attached to an end member of a bunk.
Figure 32:
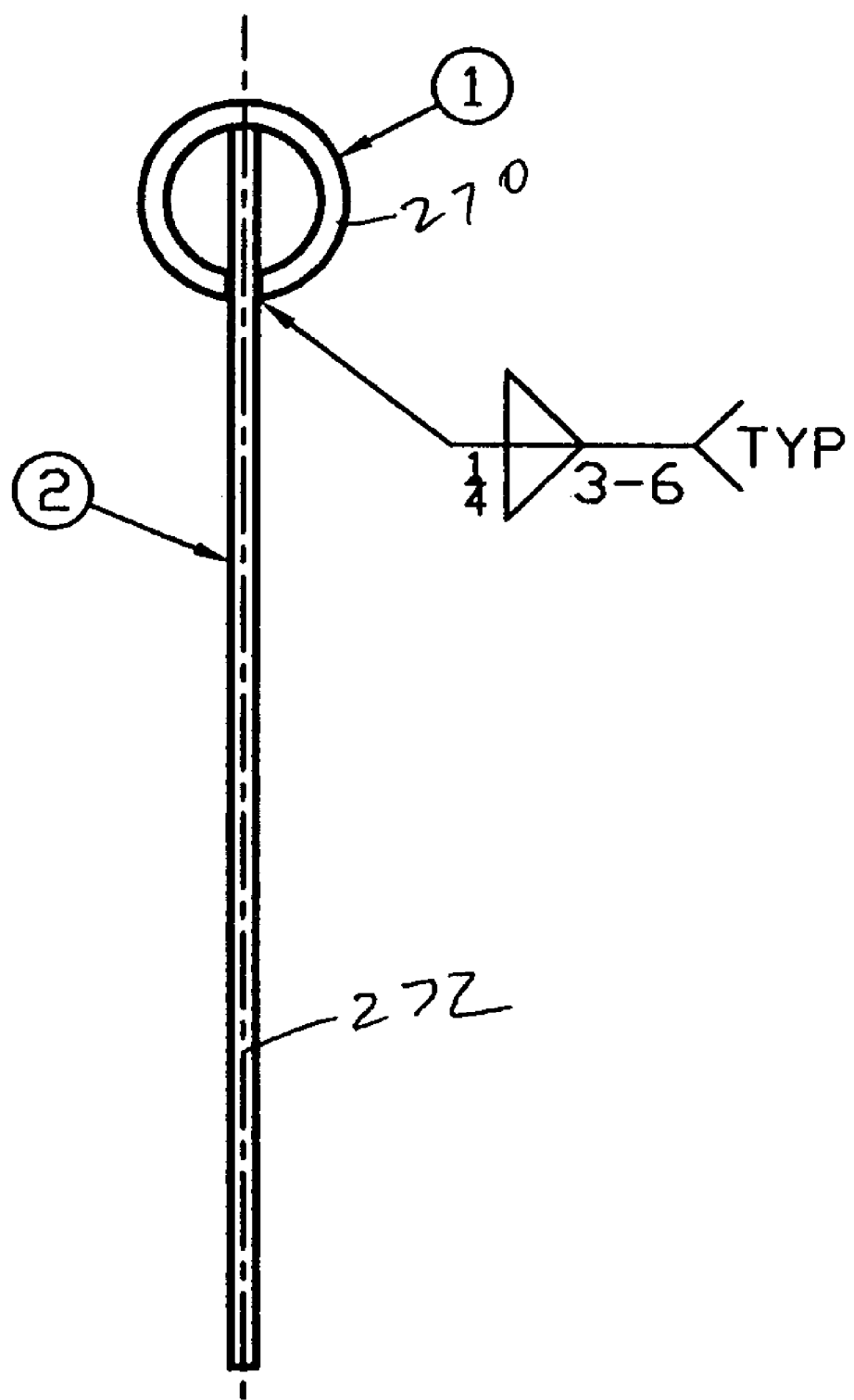
FIG. 32 is a side view of a fulcrum attached to an end member of a bunk.

The fulcrum 270, as shown in FIGS. 20 and 31-32, is attached to the end member 272 of the bunk 264. The fulcrum 270 is an elongated hollow tube that is oriented in a transverse direction to the longitudinal length of the bunk 264. The fulcrum 270 is cut along its length such that the fulcrum 270 can be disposed about the distal end of the end member 272, as illustrated in FIG. 32. The fulcrum 270 is welded to the end member 272. As shown in FIG. 20, the end member 272 extends from the deck 12 of the railcar 10. As illustrated in FIGS. 20 and 31, the end member 272 has an aperture 300 formed therein such that the base 302 configured to receive a side post 30 extends from the deck 12 through the aperture 300. A stop member 304 is attached to the base 302 in a substantially horizontal manner such that the stop member 304 is substantially parallel to the deck 12 of the railcar 10. The stop member 304 is configured to limit the outward rotation of the clamp 262. The aperture 300 formed in the end member 272 allows the clamp 262 and the pivot mechanism 268 to be operatively connected to the fulcrum 270 such that the connecting straps 284 maintain the fulcrum 270 adjacent to the pivot mechanism 268 in an enclosing manner.

The pivot mechanism 268 is releasably attached to the end member 272 by the connecting straps 284, as shown in FIG. 31. The pivot mechanism 268 is disposed adjacent to the fulcrum 270 within the aperture 300 formed in the end member 272 such that the notch 286 in the top plate 278, the notch 290 in the top reinforcement 280, and the bottom plate 282 are substantially aligned with the base 302 extending upward from the deck 12. The connecting straps 284 are attached to the top plate 278 and the bottom plate 282 such that the pivot mechanism 268 surrounds the fulcrum 270, thereby allowing the clamping mechanism 268 to engage and rotate about the fulcrum 270. The connecting straps 284 are spaced apart such that the stop member 304 is disposed between the spaced-apart connecting straps 284.

In operation, each clamp 262 is rotatable to a fully-opened position, as illustrated in FIGS. 21 and 33. When in the fully-opened position, the portions of the top plate 278 adjacent to the notch 286 located at the end of the top plate 278 extending away from the arms 266 is in an abutting relationship with the stop member 304 attached to the base 302. The stop member 304 limits the outward rotation of the clamp 262 by way of the contact between the top member 304 and the top plate 278.

Each clamp 262 is also rotatable to a closed position, as illustrated in FIGS. 22 and 33. When in the closed position, the opposing clamps 262 are rotated inwardly as a result of a cylindrical load 20 being disposed therebetween. The cylindrical load 20 contacts the lower portion 275 of the arms 266 of the clamps 262, thereby causing the opposing clamps 262 to rotate inwardly about the fulcrum 270 such that the top plate 278 and the fulcrum 270 are in sliding engagement. The opposing clamps 262 are rotated inwardly until the upper portion 274 of the arms 266 of each clamp 262 are in contact with the cylindrical load 20, thereby securing the freight. As the opposing clamps 262 rotate inwardly, the pinion 276 located at the distal end of the arms 266 of each clamp 262 translates along the rack 277, thereby locking the clamps 262 in a closed position. If the length of the cylindrical load 20 is not sufficient to contact the lower portion 275 of the arms 266 of both opposing clamps 262, the clamps 262 can be manually rotated inwardly such that the upper portion 274 of the arms 266 of both opposing clamps 262 contact the cylindrical load 20 and the pinion 276 contacts the rack 277 to secure the opposing clamps 262 in the closed position.

Each clamp 262 is further rotatable to a stowed position, as illustrated in FIGS. 22 and 33. When in the stowed position, each clamp 262 is rotated inwardly such that the upper portion 272 of the arms 266 are located below the top edge of the side members 306 of the bunk 264, as illustrated in FIG. 19. Once the clamps 262 have been rotated to the stowed position, freight can be disposed atop the bunks 264 without interference from the clamping mechanisms 260. In the stowed position, each clamp 262 is rotated inwardly until the fulcrum 270 is located in the curved portion 298 of the connecting straps 284 and the pinion 276 is disengaged from the rack 277 such that the lower portion 275 of the arms 266 are located adjacent to the side member 262 that extends from the deck 12 at an angle, as illustrated in FIG. 33. The connecting straps 284 prevent the clamps 262 from becoming disengaged from the fulcrum 270 when in the stowed position.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A support system for securing freight on a transport vehicle, said system comprising:
   a pair of opposing clamps rotatably connected to a bunk disposed on a deck of said transport vehicle;
   wherein said opposing clamps are rotatable between an open position and a stowed position;
   wherein said bunk includes an end member extending from said deck at an angle relative to said deck.

2. The support system of claim 1, wherein a fulcrum is attached to said end member, and said clamps are operatively engaged with said fulcrum.

3. The support system of claim 1, wherein each of said pair of opposing clamps includes a pivot mechanism.

4. The support system of claim 3, wherein said pivot mechanism is operatively connected to a fulcrum, and said fulcrum is operatively connected to said transport vehicle.

5. A method for stowing a clamping mechanism on a transport vehicle comprising:
   providing a pair of opposing clamping mechanisms operatively attached to a bunk of said transport vehicle, wherein said pair of opposing clamping mechanisms are rotatable between an open position, a stowed position, and a closed position, wherein said closed position is between said open position and said stowed position; and
   rotating said pair of opposing clamping mechanisms from said open position to said stowed position.

6. The method of claim 5, wherein said pair of opposing clamping mechanisms contact freight such that said freight is secured to said transport vehicle.

7. A support system for securing freight on a transport vehicle, said system comprising:
   a bunk disposed on a deck of said transport vehicle; and
   a pair of opposing clamps rotatably connected to said bunk;
   wherein the said bunk includes an end member extended from said deck at ail angle relative to said deck.

8. The support system of claim 7, wherein a fulcrum is attached to said end member, and said clamps are operatively engaged with said fulcrum.

9. The support system of claim 8, wherein each of said pair of opposing clamps includes a pivot mechanism.

10. The support system of claim 9, wherein said pivot mechanism is operatively connected to a fulcrum, and said fulcrum is operatively connected to said transport vehicle.

* * * * *